US007010968B2

(12) United States Patent
Stewart et al.

(10) Patent No.: US 7,010,968 B2
(45) Date of Patent: Mar. 14, 2006

(54) DETERMINATION OF WHEEL SENSOR POSITION USING A WIRELESS SOLUTION

(75) Inventors: William David Stewart, Antrim (GB); Idir Boudaoud, Cretail (FR); Nevin Robert Molyneaux, Antrim (GB); Samuel Kane Strahan, Ballymena (GB); Alan Kenneth McCall, TemplePatrick (GB); Trevor Anthony Jordan, Carrickfergus (GB)

(73) Assignee: Schrader Bridgeport International, Inc., Denver, CO (US)

( * ) Notice: Subject to any disclaimer, the term of this patent is extended or adjusted under 35 U.S.C. 154(b) by 339 days.

(21) Appl. No.: 10/125,043

(22) Filed: Apr. 18, 2002

(65) Prior Publication Data

US 2003/0197603 A1   Oct. 23, 2003

(51) Int. Cl.
*G01M 17/02* (2006.01)

(52) U.S. Cl. .................................................. 73/146
(58) Field of Classification Search ........ 73/146–146.8; 340/440–447
See application file for complete search history.

(56) References Cited

U.S. PATENT DOCUMENTS

| | | | |
|---|---|---|---|
| 3,956,931 A | * | 5/1976 | Grosch et al. ................ 73/146 |
| 5,600,301 A | | 2/1997 | Robinson, III |
| 5,602,524 A | | 2/1997 | Mock et al. |
| 5,612,671 A | | 3/1997 | Mendez et al. |
| 5,774,047 A | | 6/1998 | Hensel, IV |
| 5,838,229 A | | 11/1998 | Robinson, III |
| 5,880,363 A | | 3/1999 | Meyer et al. |
| 5,883,305 A | | 3/1999 | Jo et al. |
| 6,018,993 A | | 2/2000 | Normann et al. |
| 6,034,597 A | | 3/2000 | Normann et al. |
| 6,062,072 A | | 5/2000 | Mock et al. |
| 6,112,585 A | | 9/2000 | Schrottle et al. |
| 6,112,587 A | | 9/2000 | Oldenettel |
| 6,181,241 B1 | | 1/2001 | Normann et al. |

(Continued)

FOREIGN PATENT DOCUMENTS

| | | |
|---|---|---|
| DE | 10012458 A1 | 9/2001 |
| EP | 0 760 299 B1 | 7/1996 |
| EP | 1 215 056 A2 | 6/2002 |
| WO | WO 01/69265 A1 | 9/2001 |

OTHER PUBLICATIONS

MEMSIC, Inc. brochure titled Low Cost, ±1g Dual Axis Accelerometer With Analog Outputs MXA2500A, undated but prepared prior to Apr. 18, 2002, pp. 1–3.

(Continued)

*Primary Examiner*—William Oen
*Assistant Examiner*—Jermaine Jenkins
(74) *Attorney, Agent, or Firm*—Brinks Hofer Gilson & Lione

(57) ABSTRACT

A tire monitor for use in conjunction with a remote tire monitoring system of a vehicle includes in one embodiment a dual-axis accelerometer and a control circuit. The control circuit determines position information such as the right/left position of the tire monitor on the vehicle in response to an acceleration signal from the dual axis accelerometer. The tire monitor transmits tire data and the position information to a control unit of a remote tire monitor system. The control unit determines additional position information such as front/rear position of the transmitting tire monitor by detecting signal strength of the transmission. This allows the system to automatically re-learn the position of tire monitors on the vehicle, even after tire rotation.

29 Claims, 17 Drawing Sheets

U.S. PATENT DOCUMENTS

| | | | |
|---|---|---|---|
| 6,204,758 B1 * | 3/2001 | Wacker et al. | 340/444 |
| 6,218,936 B1 | 4/2001 | Imao | |
| 6,252,498 B1 | 6/2001 | Pashayan, Jr. | |
| 6,259,361 B1 * | 7/2001 | Robillard et al. | 340/447 |
| 6,271,748 B1 | 8/2001 | Derbyshire et al. | |
| 6,278,363 B1 | 8/2001 | Bezek et al. | |
| 6,304,172 B1 | 10/2001 | Katou et al. | |
| 6,340,930 B1 | 1/2002 | Lin | |
| 6,384,720 B1 | 5/2002 | Juzswik et al. | |
| 6,446,502 B1 | 9/2002 | Normann et al. | |
| 6,489,888 B1 | 12/2002 | Honeck et al. | |
| 6,518,875 B1 | 2/2003 | DeZorzi | |
| 6,518,876 B1 | 2/2003 | Marguet et al. | |
| 6,581,449 B1 | 6/2003 | Brown et al. | |
| 6,633,229 B1 | 10/2003 | Normann et al. | 340/447 |
| 6,788,193 B1 | 9/2004 | King et al. | 340/447 |
| 2001/0002451 A1 | 5/2001 | Breed | |

OTHER PUBLICATIONS

MEMSIC, Inc. brochure titled Application Note #AN–ooMX–001: The Fundamentals, undated but prepared prior to Apr. 18, 2002, pp. 1–8.

International Search Report in International Application No. PCT/US03/11582, dated Aug. 11, 2003, 4 pages.

PCT Written Opinion for International Application No. PCT/US03/11582 (5 pages).

* cited by examiner

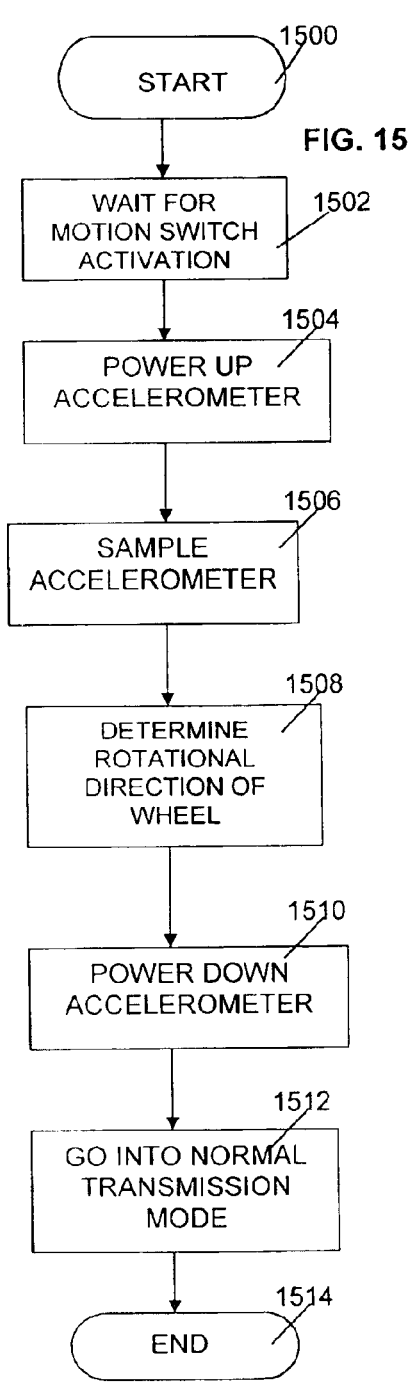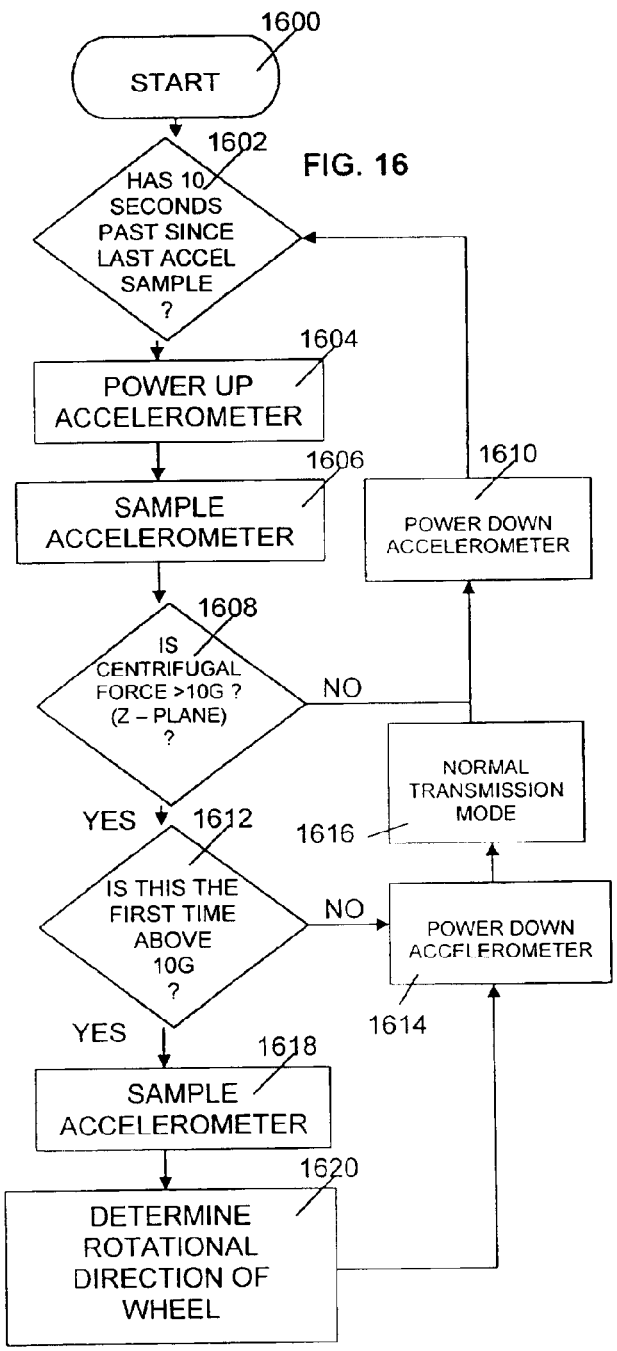

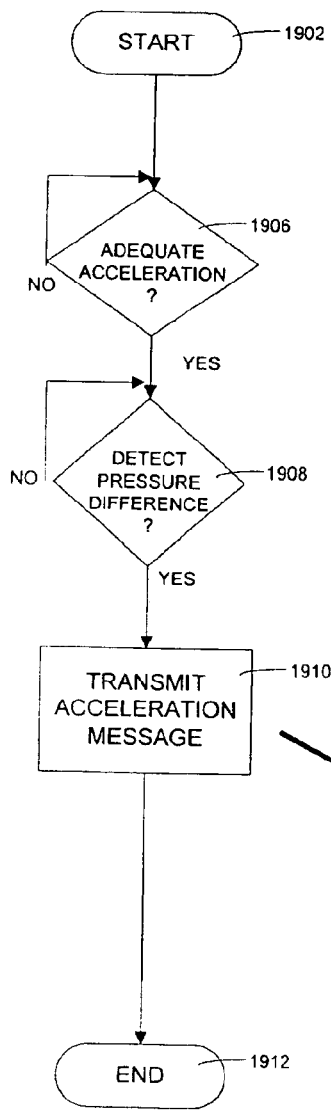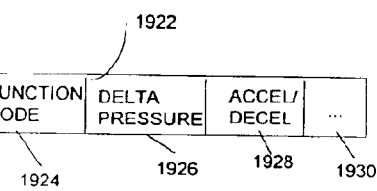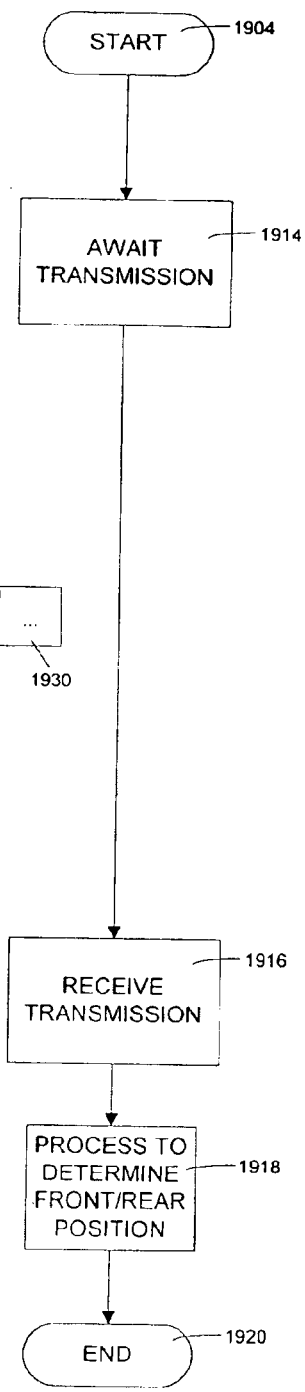
FIG. 19

DETERMINATION OF WHEEL SENSOR POSITION USING A WIRELESS SOLUTION

CROSS REFERENCE TO RELATED APPLICATIONS

This application is related to U.S. patent application Ser. No. 09/557,682, filed Apr. 25, 2000 in the names of Emmanuel Marguet and William Stewart and to application Ser. No. 10/021,284, filed Oct. 29, 2001 in the names of William Stewart, Idir Boudaoud and Stephen Thomas McClelland, both of which are commonly assigned to the owner of the present application. Application Ser. No. 09/557,682 and application Ser. No. 10/021,284 are incorporated herein in their entirety by this reference.

BACKGROUND

The present invention relates generally to a remote tire monitoring system. More particularly, the present invention relates to a method and apparatus for automatically updating position information for tire monitors in such a system.

Systems have been developed to monitor a characteristic such as tire pressure of a vehicle and to report the characteristic to a receiver at a central monitoring station using radio transmissions. A monitor is located at each tire and periodically takes a measurement of the tire characteristic. The monitor then transmits the results of the measurement in a radio frequency transmission to the central monitoring station which produces an alarm or a display in response to the measurement.

One problem with such systems has been the need to program the location of the transmitters at the central station. To be fully useful, the tire characteristic data is preferably associated with the tire which originated the measurement when presenting a display or alarm. Each monitor includes identification information which can be transmitted with the measurement. The tire monitor is preferably activated to produce this information and the information is then conveyed to the central station and associated with the position of the tire.

In the technique of U.S. Pat. No. 5,600,301, the tire monitors each include a reed switch or other magnetic device. A magnet is passed near the reed switch, causing the monitor to transmit a radio frequency transmission that includes identification data. A service technician repeats this process at each wheel and then loads the identification and position information into the central monitoring station. Another method provides a printed bar code on each tire monitor which contains the identification information and which may be read with a suitable bar code reader.

In U.S. Pat. No. 5,880,363, an activation signal is provided from the central controller to a low frequency transmitter at each wheel well. The transmitter generates a low frequency signal to activate the tire monitor. The tire pressure monitor responds by generating a long wave identification signal and transmitting that signal with tire pressure and identification data directly to the control unit. The long wave identification signal is used to identify the position of the tire by distinguishing this transmission from other transmissions received by the controller.

U.S. Pat. No. 5,883,305 discloses two-way communication of data by radio signals. A tire pressure monitor is activated by a radio frequency signal transmitted by an antenna in the wheel well adjacent the tire. The tire pressure monitor transmits a second radio frequency signal which is detected by the wheel well antenna. The second signal is demodulated to detect that tire pressure data.

U.S. Pat. No. 6,204,758B1 discloses a tire monitor including a tangential accelerometer for detecting acceleration of the tire monitor. Tangential acceleration along a single axis is detected to determine acceleration. Position information for the tire monitor is determined in response to the acceleration.

These previous techniques have been limited in effectiveness. The magnetic programming technique may be subject to interference and crosstalk, for example in a factory where many such tire monitors are being assembled with tires and vehicles. The bar code label system requires a label at each tire which can be lost or become dirty or illegible. The apparatus for transmitting a long wave activation signal and generating a long wave identification signal therefrom is too expensive for some applications. The two-way data communication techniques requires demodulation of the received radio signals at the wheel well and coaxial cabling back to the central controller, both of which add to the cost of the system. The tangential acceleration which must be sensed requires a highly sensitive accelerometer which may be prohibitively expensive in the current application.

A further limitation of some of these prior techniques is the manual operation requiring activation by a service technician. A system is desired which automatically conveys wheel position data to the receiver. Such a system would be particularly useful after any change in tire position, such as tire rotation or replacement of a tire.

U.S. patent application Ser. No. 09/557,682, commonly assigned with the present application, discloses a system and method in which tire monitors are located at each wheel of the vehicle and periodically transmit tire data along with a tire monitor identifier. Four small, inexpensive RF detectors are located near each wheel. Each RF detector is connected to the central control unit by a power line and a ground line. When a tire monitor transmits data by emitting an RF transmission, the RF detector that is closest to the transmitter will detect the burst of RF energy. The RF detector responds to the RF energy by modulating the power line to the control unit with the envelope of the transmitted data. The control unit detects this modulation on one of its power lines. Also, the RF receiver of the control unit receives and demodulates the data transmitted by the tire monitor. The control unit associates the received data with the position indication provided by the modulation on the power line. When the positions of the wheels on the vehicle are changed, the control unit can determine the new position using the modulated power line in association with the tire monitor identifier in the transmitted data.

While this system has been very successful in application, a system featuring reduced cost and weight is desired. The cables that must be run from the control unit to all four RF detectors add substantially to the cost and weight of an installation. Accordingly, there is a need for a system and method which provide the operational advantages of the earlier system in a system offering reduced complexity, parts count, weight and cost.

SUMMARY

By way of introduction only, a tire monitor for use in conjunction with a remote tire monitoring system of a vehicle includes in one embodiment a dual-axis accelerometer; and a control circuit configured to determine position information about position of the tire monitor on the vehicle in response to an acceleration signal from the dual axis accelerometer.

In another embodiment, a tire monitor method includes, at a tire monitor, determining first acceleration along a first axis and second acceleration along a second axis and, based on the first acceleration and the second acceleration, determining position information about position of the tire monitor on a vehicle.

In yet another embodiment, a remote tire monitoring system for a vehicle includes a plurality of tire monitors associated with respective tires of the vehicle and a control circuit. Each tire monitor includes an accelerometer, a monitor position information determining circuit responsive to an acceleration signal from the accelerometer, and a position information radio transmitting circuit. The control circuit includes a position information radio receiving circuit and a respective tire monitor position determining circuit.

In yet another embodiment, a tire monitor for use in a remote tire monitor system for tires of a vehicle includes means for determining a direction of rotation of an associated wheel and means for determining right/left position information based on the direction of rotation. The tire monitor further includes transmitting means for transmitting data related to the right/left position information for the tire monitor.

In yet another embodiment, a tire monitor method for a tire monitor positioned at a wheel of a vehicle includes receiving a tire motion indication, sampling an accelerometer signal produced by a multiple-axis accelerometer, determining rotation direction for the wheel based on the accelerometer signal, and determining position information for the wheel based on the rotation direction. The method further includes transmitting data to a remote receiver based on the position information.

In a further embodiment, a tire monitor method for a tire monitor positioned at a wheel of a vehicle includes sampling an accelerometer signal produced by a multiple-axis accelerometer. If an acceleration indication of the accelerometer signal exceeds a threshold, the method includes determining rotation direction for the wheel based on the accelerometer signal, determining position information for the wheel based on the rotation direction, and transmitting data to a remote receiver based on the position information.

The foregoing discussion of the preferred embodiments has been provided only by way of introduction. Nothing in this section should be taken as a limitation on the following claims, which define the scope of the invention.

BRIEF DESCRIPTION OF THE DRAWING

FIGS. 15 and 16 are flow diagrams illustrating two embodiments of operation of the tire monitor of FIG. 7;

FIG. 19 is a flow diagram illustrating operation in an alternative embodiment of a remote tire monitor system.

DETAILED DESCRIPTION OF THE PRESENTLY PREFERRED EMBODIMENTS

Figure 1:
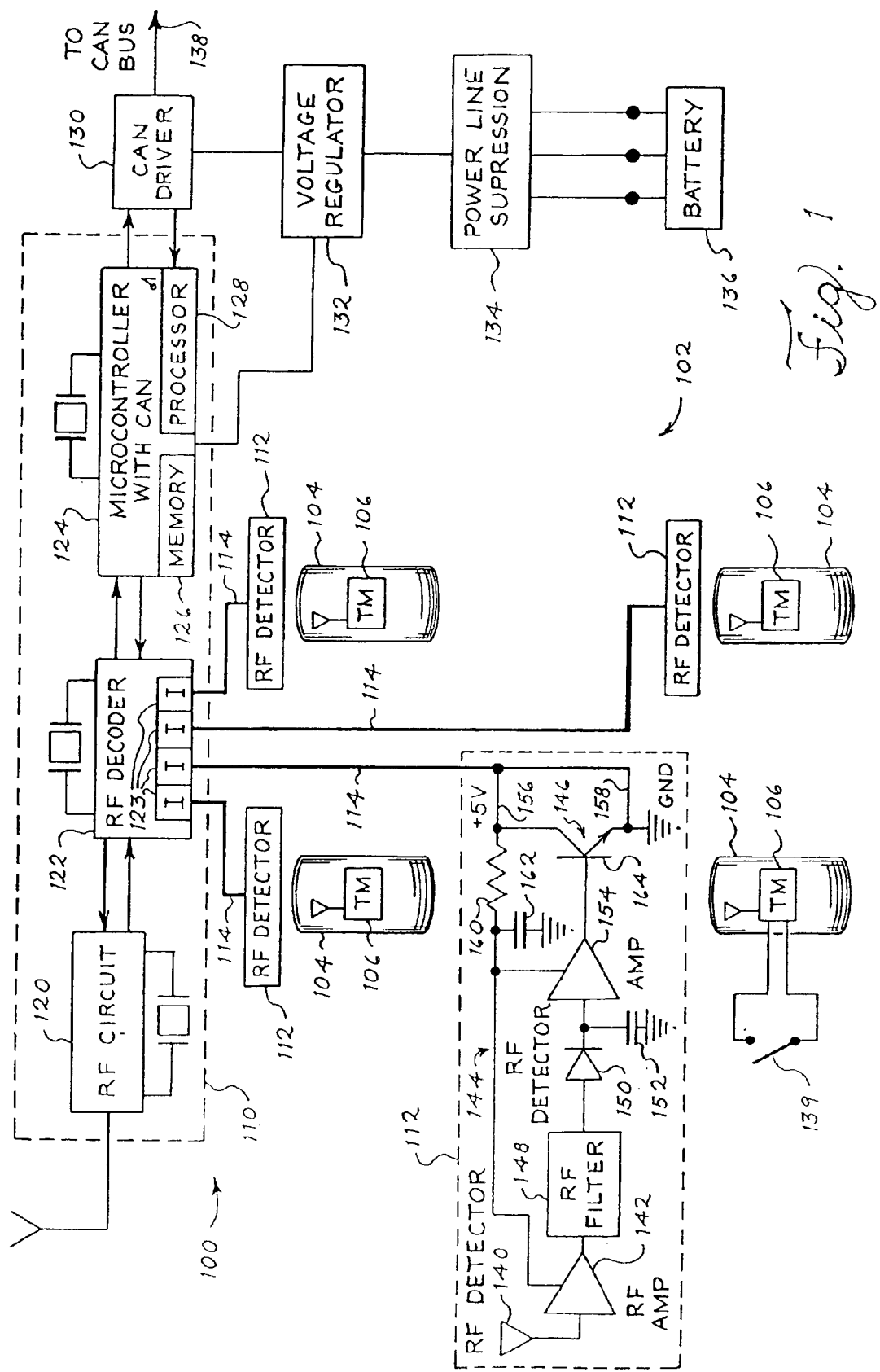
FIG. 1 is a block diagram of one embodiment of a remote tire monitor system shown in conjunction with portions of a vehicle.

Referring now to the drawing, FIG. 1 is a block diagram of a remote tire monitor system 100 shown in conjunction with portions of a vehicle 102. The vehicle 102 includes in this example four tires 104. Other numbers of tires may be included, such as a fifth tire as a spare or additional tires if the vehicle is a truck, trailer or other multi-wheeled vehicle.

Associated with each of the tires 104 is a transmitter or tire monitor 106. Each of the tire monitors 106 includes a battery powered, radio frequency (RF) transmitter. Any suitable tire monitor may be used. U.S. patent application Ser. No. 09/245,938, entitled "Method And Apparatus For A Remote Tire Pressure Monitor System," filed Feb. 5, 1999 in the name of McClelland et al., and commonly assigned with the present application is incorporated herein by reference and illustrates one suitable tire monitor for use in the remote tire pressure monitor system 100. Each tire monitor 106 includes a sensor such as a pressure sensor for measuring a tire characteristic. The tire monitor 106 converts the measured tire characteristic to tire data. The tire data is encoded for transmission from the tire monitor 106.

The tire monitor further includes a transmitter configured to transmit RF signals including the tire data. In some embodiments, the transmissions are encoded or randomized to minimize clashes at a receiver. For example, U.S. patent application Ser. No. 09/245,577, entitled "Method For Communicating Data In A Remote Tire Pressure Monitoring System," filed Feb. 5, 1999 in the name of Bailie, et al., and commonly assigned with the present application is incorporated herein by reference. This application shows a technique in which data words are transmitted separated by a time delay. The time delay for each respective data word is defined according to a repeating pattern common to the tires so that data words are transmitted during a plurality of aperiodic time windows. Transmission parameters such as modulation techniques, transmission frequency and transmission power are chosen according to local regulations and to assure reliable reception of the RF signals.

The tire monitor 106 includes a motion switch 139. The motion switch 139 closes upon detection of movement of the vehicle 100. The motion switch 139 provides a signal to the processor 124 indicating closure of the switch 139 and motion of the vehicle. In response to closure of the switch, the tire monitor system 100 begins operating, for example, by transmitting tire data. In the illustrated embodiment, during normal operation, the tire monitor 106 transmits supervisory tire pressure information once every minute. Any suitable motion switch may be used for the switch 139.

The remote tire monitor system 100 includes a control unit 110 and a plurality of radio frequency (RF) detectors 112. In alternative embodiment, the remote tire monitor system 100 additionally includes a user display for providing user information such as tire pressure information and low tire pressure alarms. In the illustrated embodiment, each RF detector 112 is mounted on the vehicle 102 proximate an associated tire monitor 106 to detect the RF signals from the associated tire monitor 106 and produce a transmission indication in response to detected RF signals. Each of the RF detectors 112 is electrically coupled by a conductor 114 to the control unit 110. Structure and operation of the RF detectors 112 will be described in greater detail below.

The control unit 110 includes an RF receiver 120, an RF decoder 122, and a controller 124. The RF receiver 120 is configured to receive RF signals conveying tire data from at least one transmitting tire monitor 106 of the plurality of tire monitors 106 associated with the wheels or tires 104 of the vehicle 102. Any suitable RF receiver circuit may be used. The design and implementation of the RF receiver 120 will depend on the type of modulation used for the RF signals, transmission frequency for the RF signals, and physical limitations such as permitted size, weight and power dissipation.

The RF decoder 122 is configured to receive a transmission indication from at least one receiving RF detector 112 of a plurality of RF detectors 112 associated with wheels or tires 104 of the vehicle 102. Thus, a tire monitor 106 will transmit RF signals which are detected by the RF detector 112 associated with the transmitting tire monitor 106. The receiving RF detector 112 signals its detection of the RF signals by providing the transmission indication on its associated conductor 114.

The RF decoder 122 is further configured to identify a position of a transmitting tire monitor on the vehicle in response to the transmission indication received from an RF detector. Accordingly, the RF decoder 122 includes a plurality of input circuits 123 coupled to the conductors 114 which are in turn coupled to the RF detectors 112. A transmission indication impressed on a conductor 114 is detected by an associated input circuit 123. In the illustrated embodiment, there is a one-to-one relationship between input circuits 123 and RF detectors 112. In this manner, the RF detector 112 which originated the transmission indication may be identified by the RF decoder determining which input circuit 123 detects the transmission indication. In alternative embodiments, the RF decoder 122 may include fewer than four input circuits 123 which are multiplexed in some manner among the plurality of RF detectors 112. For example, a single input circuit 123 may be time shared among the plurality of RF detectors 112 to reduce the cost and complexity of the RF decoder 122.

The RF decoder 122 is electrically coupled with the RF circuit 120. Upon receipt of RF signals at the RF circuit 120, the RF signals are demodulated to extract the tire data contained within the RF signals. In some applications, additional data decoding may be required after demodulation. The tire data in one exemplary embodiment includes a tire monitor identifier, or unique identification code which uniquely identifies the tire monitor 106 which transmitted the RF signals. In addition, in this exemplary embodiment, the tire data also includes tire pressure data related to a sensed tire pressure of the tire 104 at which the transmitting tire monitor 106 is located. Alternative tire data may be included or substituted for the tire pressure data, such as a number of tire revolutions, tire temperature, and so forth.

After extracting the tire data from the RF signals, the tire data is conveyed from the RF receiver 120 to the RF decoder 122. The RF decoder 122 associates the tire data with a position of the transmitting tire monitor 106 on the vehicle 102. Position information is determined using the input circuit 123 and a transmission indication received over a conductor 114 from RF detector 112. The tire data and associated tire position are conveyed from the RF decoder 122 to the controller 124.

The controller 124 controls the operation of the remote tire monitor system 100. The controller 124 is preferably a microcontroller including a processor 128 and a memory 126. The processor 128 operates in response to data and instructions stored in the memory 126 to control overall operation of the system 100.

In the illustrated embodiment, the processor 128 stores position data for a plurality of tire monitors 106 of the remote tire monitor system 100. The controller 124 is electrically coupled to the RF decoder 122 to receive tire data and position data from the RF decoder 122. In the illustrated embodiment, when tire data and position data are received at the microcontroller 124, the processor 128 retrieves stored position data from the memory 126. In one embodiment, the position data are stored in association with a position on the vehicle, such as left front, left rear, right front or right rear. The received position data is compared with the stored position data. If there is no change, the position data is not updated and further processing may occur using the received tire data. However, the processor 128 updates the position data for the transmitting tire monitor 106 when the position of the transmitting tire monitor 106 varies from the stored position data for the transmitting tire monitor. Thus, the controller 124 includes a memory 126 and a processor configured to store in the memory 126 position of the plurality of tire monitors 106 including the position of the transmitting tire monitor which originated the received position data.

In an alternative embodiment, the memory 126 is not used for storage of position data. Rather, the received tire data is associated by the control unit 110 with the position information provided by the transmission indication from a RF detector 112. The tire data and the position information from the input circuit 123 are used together to produce a display or alarm, if appropriate, by the system 100. Additionally, in still another embodiment, the tire data omits any identifying information for the transmitting tire monitor 106 and again, the tire data and the position information from the input circuit 123 are used together to produce the appropriate display or alarm.

Completing the identification of the elements in FIG. 1, the vehicle 102 further includes a CAN driver 130, a voltage regulator 132, power line noise suppressor 134, and a battery 136. The battery 136 provides operating power for electrical systems of the vehicle 102 including the remote tire monitor system 100. The battery 136 is a portion of the electrical power system of the vehicle, which typically also includes an alternator and other components. Such electrical power systems for vehicles are well known. The power line suppressor 134 reduces noise on the power line from the battery 136. Noise may originate in other electrical components of the vehicle 102, such as the ignition system. The voltage regulator 132 receives the battery voltage or other operating voltage from the power line suppressor 134 and produces a well regulated voltage for components such as the control unit 110 and CAN driver 130. The CAN driver 130 provides electrical interface with other elements of a Controlled Area Network. Controlled Area Network or CAN is a serial communication protocol for data commonly used in automotive and other applications. The CAN bus 138 accessed by the CAN driver 130 is used to interconnect a network of electronic nodes or modules. The CAN bus operates according to an adopted standard. In conjunction with a remote tire pressure monitor system 100, the CAN bus 138 may be used to convey tire monitor data to other locations in the vehicle 102. For example, an alarm or a display (not shown) may be controlled to provide a visual or audible indication to an operator of the vehicle 102 that the tire data indicates an out-of-range condition, such as low tire pressure.

In FIG. 1, the RF decoder 122 and the controller 124 are shown as separate elements of the control unit 110. In alternative embodiments, they may be combined in a single processor or logic block or circuit. Any other illustrated elements or additional elements included to enhance the functionality of the system 100 may be integrated or combined with other components of the system 100.

Further, the system 100 should not be restricted to use in conjunction with a CAN bus. In alternative embodiments, any other communications medium may be employed for interconnecting the system 100 with other elements of the vehicle 102. For example, communication buses in accordance with the J-1850 or USB standards may be substituted, or the control unit 110 may be directly hard wired with other elements of the vehicle 102. Still further, external communications may be omitted entirely so that the system 100 is completely self-contained.

FIG. 1 further shows a detailed view of one embodiment of an RF detector 112 for use in the remote tire monitor system 100. The RF detector 112 includes an antenna 140 to sense radio frequency (RF) signals transmitted from the tire monitor 106, an amplifier 142, an envelope detector coupled to the antenna 140 through the amplifier 142 and an output circuit 146 coupled to the envelope detector 144. The envelope detector 144 includes a filter 149, a diode 150, a capacitor 152 coupled to ground and an amplifier 154. The RF detector 112 is powered from a power line 156 and a ground line 158 provided on the conductor 114 which couples the RF detector 112 to the input circuit 123 of the RF decoder 122. To isolate the operational circuitry of the RF detector 112 from noise on the power line 156, the RF detector 112 further includes a resistor 160 and a capacitor 162 to ground.

The envelope detector 144 responds to the input signals received at the antenna and amplified by the amplifier 142 to produce at the output circuit 146 data corresponding to the envelope of the RF signals transmitted by the tire monitors 106. Thus, the filter 148, diode 150 and capacitor 152 together form a circuit coupled with the antenna 140 to detect an envelope of electrical signals produced by the antenna in response to the RF signals. The envelope is itself an electrical signal which is amplified in the amplifier 154. The output signal from the amplifier 154 is applied to the base of a transistor 164. In response to this signal at its base, the transistor 164 modulates a wireline signal on the conductor 114 in response to the envelope of the RF signals received at the RF detector 112. That is, the signals applied at the base of the transistor 164 control turn-on of the transistor 164, conducting current from its collector at the power node of the conductor 114 to its emitter at the ground node of the conductor 114. As a result, the current in the conductor 114 will be modulated in response to the RF signals received at the antenna 140 of the RF detector 112.

In one embodiment, to detect the modulated current, the input circuits 123 of the RF decoder in the illustrated embodiment may include a current mirror which duplicates the current drawn from the input stage of the input circuit 123, coupled to the conductor 114. The output current from the current mirror in the input circuit 123 is provided to a resistor which converts the current signal into a voltage signal which can be read by the microcontroller 124. Suitable current mirror circuits are within the purview of those ordinarily skilled in the art of circuit design.

In this manner, then, the signal provided on the conductor 114 forms a transmission indication indicating that the tire monitor 106 associated with the RF detector 112 has transmitted an RF signal which was detected by the RF detector 112. Producing the transmission indication includes detecting the envelope of the RF signals transmitted by the tire monitor 106 and producing a wireline signal on the conductor 114 in response to the envelope of the RF signals. In particular, in the illustrated embodiment, the wireline signal is produced by modulating a current in a conductor 114 coupled with the control unit 110. The control unit 110 detects the modulation of the current to locate the transmitting tire monitor 106.

Significantly, the RF detector 112 does not demodulate the data transmitted by the tire monitor 106. Only the RF circuit 120 of the control unit 110 demodulates the data to extract the contents of the RF signal 106. The RF detector only senses the presence of the transmitted RF signals. This reduces the cost of the RF detectors 112 and the overall cost of the remote tire monitor system 100.

Also, by modulating the current in the conductor 114, the RF detector's sensitivity to noise is reduced. Noise will occur in the form of voltage spikes or pulses on the conductor 114. However, this noise will have little effect on the operation of the RF detector 112 and will have little effect on the current levels in the conductor. As a result, the conductor 114 can be, for example, a twisted pair of wire or any other inexpensive two-wire cable. Coaxial cable or other shielded cable is not necessary for implementing the system 100 using RF detector 112.

In alternative embodiments, the RF circuit 120 may be omitted. In such an embodiment, the RF detectors 112 are used to detect the variations in the radio frequency signals and modulate a wire line signal on the conductors 114. The RF decoder 122 in such an embodiment is configured to demodulate the data in conjunction with the microcontroller 124. Current pulses on the conductor 114 are detected by the RF decoder 122 and converted to voltage pulses. The voltage pulses can be read by the microcontroller 124. In this manner, microcontroller 124 obtains the data from the RF detectors and the RF decoder, without use of an RF circuit 120. This has the advantage of eliminating the relatively expensive RF circuit. Further, this permits reduction in the transmit power used by the tire monitors 106 to transmit the radio frequency signals conveying the entire data. In some jurisdictions, substantially attenuated transmit power is required for applications such as tire monitors. These low transmit power requirements may be satisfied while still providing reliable performance in the remote tire monitoring system 100 by use of the RF detectors 112.

In still other embodiments, the functionality described herein may be implemented using a programmed computer or other processor operating in response to data and instructions stored in memory. The processor may operate in conjunction with some or all of the hardware elements described in the embodiments shown herein.

The disclosed tire monitor system may be used to provide an improved auto learn or auto train method for automatically identifying positions of a plurality of tire monitors on a vehicle. As noted above, previously devices such as a transponder or magnetic activation tools were used in the car plant to train the control unit of the remote tire monitor system with identifiers for the wheel sensors or tire monitors. With the vehicle located in a training booth or activation area at the factory, the wheel sensors were activated in sequence and the control unit, expecting activated pressure transmissions in a certain order, learned the identification and position on the vehicle of the wheel sensors. So as to prevent cross talk from other training booths, each activation area is required to be RF shielded. Another method of training the receivers was to use bar code readers to scan the identifiers of the wheel sensors and input this data into the receiver. All of these methods required an additional operation either manually or by automatic readers. These operations add cost and potential for downtime.

In the illustrated embodiment of FIG. 1, no such tools are required. In the car plant at the end of the production line, a standard one to two minute dynamic test is used to test and calibrate steering, brakes etc. of the vehicle. For the illustrated embodiment, positions and identities of the four tire pressure monitor wheel sensors are automatically learned during this dynamic test.

This is achieved by placing the control unit or receiver in a "learn state" at a dynamic test booth. The wheel sensors transmit either once a minute as in the normal mode, or in a special initial mode corresponding to a brand new, right out of the box state, transmitting more often, for example every 30 seconds, or every 10 seconds.

For example, when the wheel sensors leave the manufacturer's production line, they are placed in off mode. This mode means that each wheel sensor is dormant until it is activated by the closing of its motion switch. Closing the motion switch is only achievable through centrifugal force caused by spinning the tire monitor on a rotating wheel. During normal operation, the wheel sensor, while driving, transmits tire information including supervisory tire pressure once every minute. However, in the illustrated embodiment, for the driving periods during the first 16 activations of the motion switch, the wheel sensor will transmit the supervisory pressure data once every 30 seconds (to conform to United States regulatory requirements) or 10 seconds outside the United States. Other time intervals may be used. After the initial 16 transmissions, or any other suitable number, the transmission interval is changed to its normal mode value, such as one minute. This initial mode is known as factory test mode.

At the time of the dynamic vehicle test, the vehicle is accelerated, causing the wheel sensors to activate with the rotation of the wheels and associated closure of their motion switches. When the wheel sensors begin transmitting tire pressure, say once every thirty seconds, each sensor's identifier is transmitted by the sensor and is received up by the RF circuit of the control unit. In this initial unlearned state, the receiver loads the new identifier into memory, associating the transmission with one of the four RF detectors. Only data received which also is synchronized to activity on one of the RF detector conductors is regarded as valid. Over the one to two minute duration of the dynamic test, each wheel sensor will transmit numerous times and the control unit can verify the tire information, such as each wheel sensor identifier, and associated wheel position. The control unit can then load this data into non-volatile memory for subsequent normal use.

Key advantages of this auto-learn technique is the lack of any additional labor or equipment at the vehicle assembly plant, and the lack of a need for a transponder component or magnetic switch in the wheel sensor. Also there is no possibility of learning the wrong wheels, from other vehicles due to cross talk or of getting the wrong position. Thus, cost is reduced, operation is simplified and reliability is increased. Using the illustrated embodiment of the tire monitor system, no additional activation or learning tools are required to train the control unit with the wheel sensors' position on the vehicle. The only device required to train the control unit is the standard dynamic vehicle test at the end of line test in the vehicle assembly plant. Because the training procedure can be carried out in parallel with the steering and braking tests on the rolling road, and because of the factory test mode feature, no extra time or cost is required to 'auto learn' the tire monitor system.

The illustrated embodiment further provides for automatic update of tire monitor position information in the control unit upon replacement of one of the tire monitors of the system. This would occur, for example, if one of the wheels or tires of the vehicle is replaced. Due to the nature of the current embodiment, where the RF detectors are continuously indicating the position of the wheel sensors, a wheel sensor may be replaced and detected by the control unit without the need for user intervention. In this case, where a new wheel sensor is put on a wheel, the control unit initially realizes it is receiving a wrong identifier for the tire monitor, but still getting RF detector pulses from a particular wheel position. In addition, the control unit detects that the previously stored identifier for that position is no longer being received. Over a period of time, say ten minutes driving, the receiver verifies it has stopped receiving a stored identifier and is now receiving a new ID for that position. After verification, the new identifier is stored for that position and operation continues as normal.

The big advantage of this is the lack of need for user intervention and elimination of the need for a service tool at each service location. Tire monitor position and identification is updated automatically.

Figure 2:
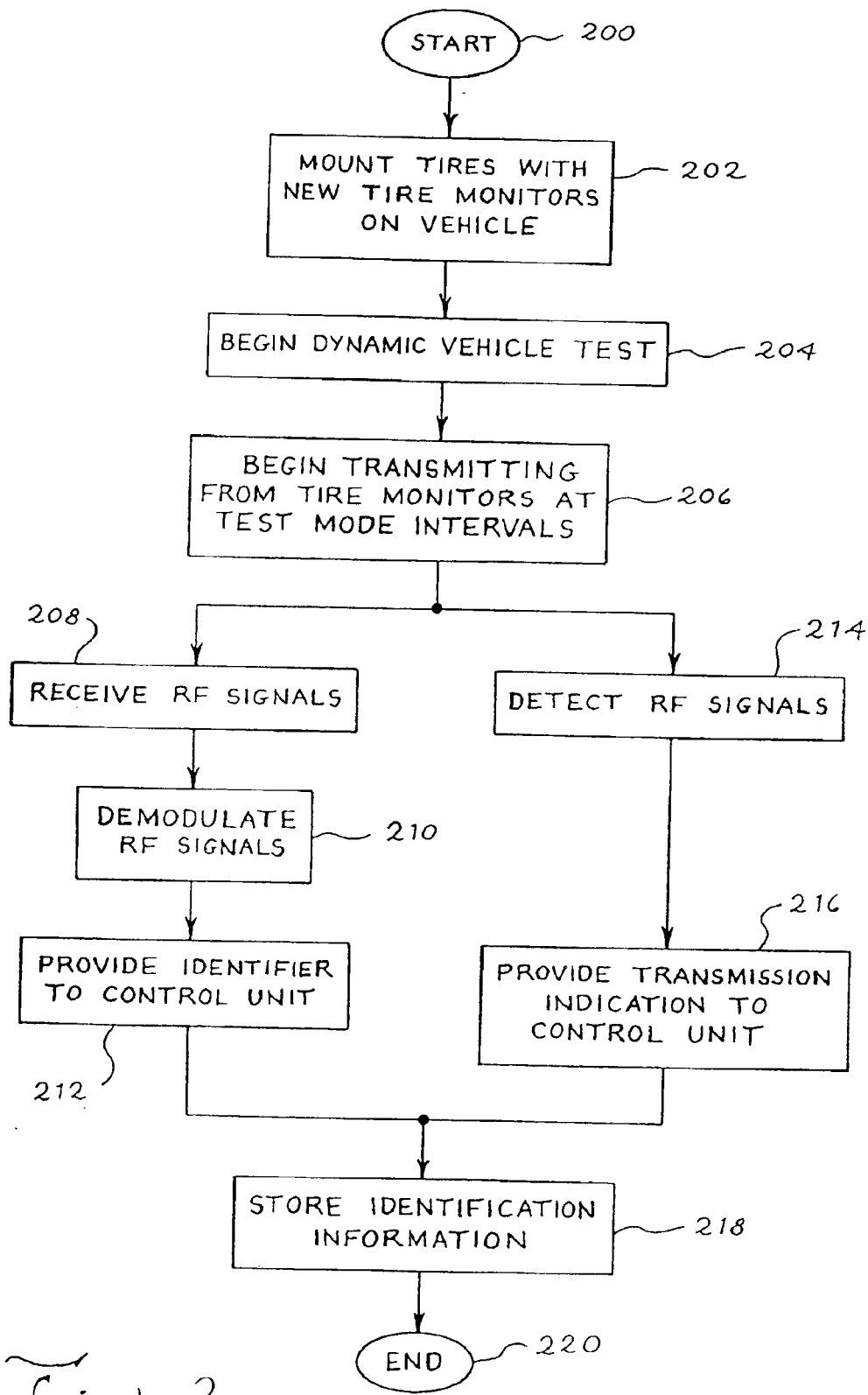
FIG. 2 is a flow diagram illustrating one embodiment of an auto learn method for the remote tire monitor system of FIG. 1.

FIG. 2 is a flow diagram illustrating an auto learn method for the remote tire monitor system of FIG. 1. The method begins at block 200. At block 202, one or more tires with new tire monitors are mounted on a vehicle which includes a remote tire monitor system. In this embodiment, the tire monitors are in unused, out of the box condition from the manufacturer. The installation of block 202 may occur as part of the final assembly of the vehicle at the factory. Alternatively, the installation may occur when new tires are installed on the vehicle or when a remote tire monitor system is added to the vehicle.

At block 204, the dynamic vehicle test is initiated and, in response, at block 206, the tire monitors begin transmitting radio frequency (RF) signals. The dynamic vehicle test is a test to check proper functionality of the systems of the vehicle, including drive train and brakes. Alternatively, any activity which causes the tire monitors to begin transmitting may be substituted at block 204 to initiate transmission at block 206. For example, the process of driving the vehicle from the end of the assembly line to a storage area or a final checkout area in block 204 may be adequate to begin transmission at block 206. It is contemplated that the tire monitors each include a motion switch which activates the tire monitor in response to motion of the tire monitor on the wheel of the vehicle.

Further, at block 206, the tire monitor begins transmitting at a test mode interval, such as once every 30 or 60 seconds. This aspect may be omitted but adds convenience for initializing the tire monitor system. After initialization, the interval may be reduced to reduce power drain from the battery which powers the tire monitor.

After transmission of the RF signals at block 206, the RF signals are received by a receiver of the remote tire monitor system at block 208. The RF signals are demodulated, decoded and otherwise processed to extract the data conveyed on the RF signals. For example, the tire monitor may modulate a carrier signal using data corresponding to pressure of the tire or a tire monitor identifier. The receiver of the remote tire monitor system demodulates the received RF signals to receive the data. At block 212, the data including a tire monitor identifier, if any, is provided to a control unit of the remote tire monitor system.

Meanwhile, the same RF signals received and demodulated at blocks 208, 210 are detected at block 214. In the preferred embodiment, the RF signals are received without demodulation, for example, using a detector of the type illustrated above in conjunction with FIG. 1. Other suitable RF detectors may be used. At block 216, in response to the detected RF signals, a transmission indication is provided to the control unit. The transmission indication indicates to the control unit which RF detector of the vehicle detected the RF signals transmitted by the tire monitor and received by the receiver at block 208.

At block 218, identification information associated with the tire monitor is stored. In one embodiment, the data forming the identifier transmitted by the tire monitor and received by the receiver of the remote tire monitor system is stored in memory. Other types and formats of identification information may be stored. For example, the control unit may store an RF detector indicator which indicates which RF detector detected the received RF signals.

In this manner, the described method provides automatic learn capability in a remote tire monitor system. No manual intervention is necessary for the control unit to identify and store the identities and locations of individual tire monitors on the vehicle. This reduces time and cost associated with initiating operation of the remote tire monitor system.

Figure 3:
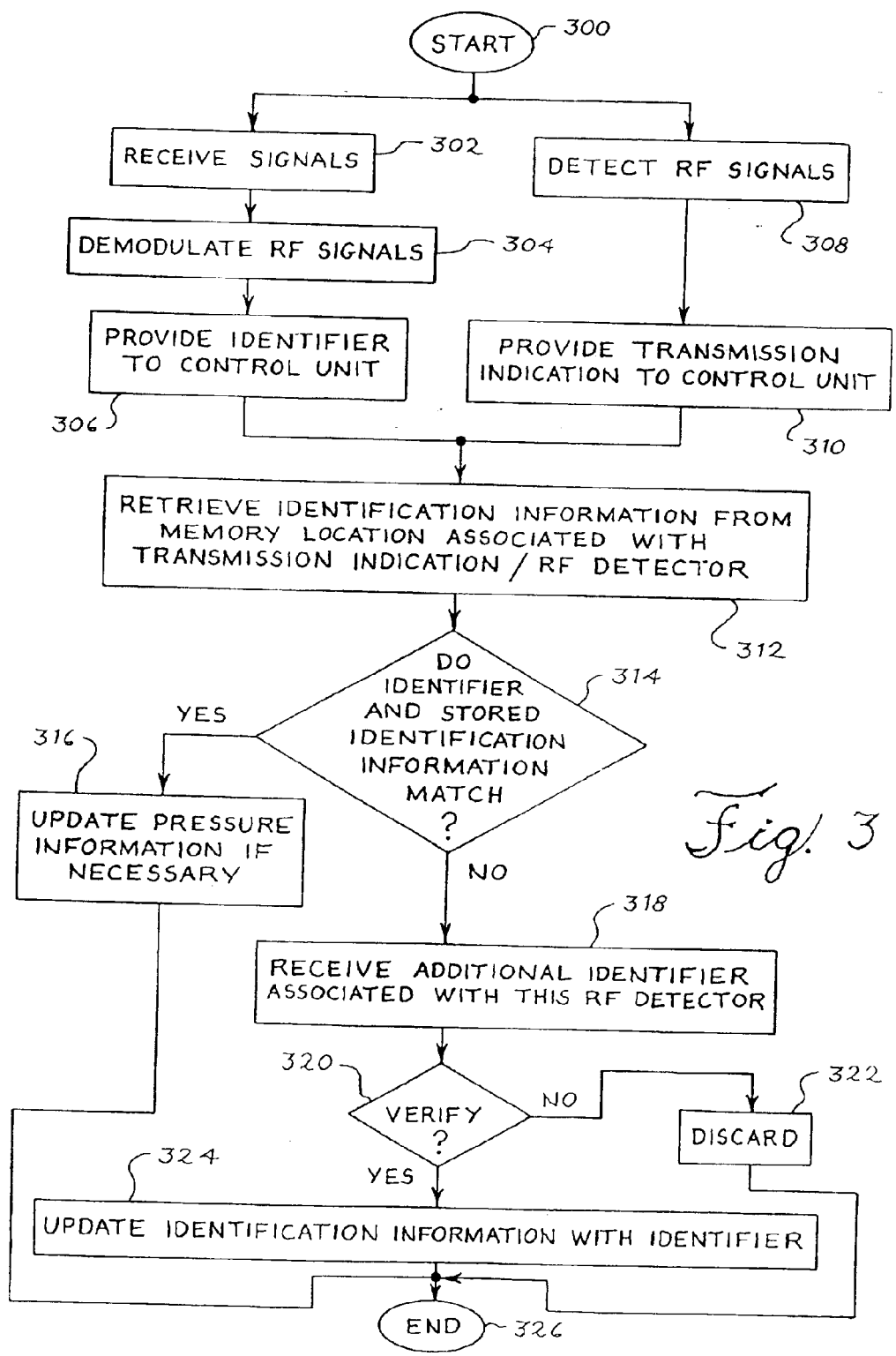
FIG. 3 is a flow diagram illustrating one embodiment of an auto learn method for the remote tire monitor system of FIG. 1.

FIG. 3 is a flow diagram illustrating an auto learn method for the remote tire monitor system of FIG. 1. The method of FIG. 3 starts at block 300.

At block 302, RF signals transmitted by a tire monitor associated with a wheel of a vehicle are received by a receiver of the remote tire monitor system. At block 304, the RF signals are demodulated, decoded and otherwise processed to extract the data conveyed on the RF signals. For example, the tire monitor may modulate a carrier signal using data corresponding to pressure of the tire or a tire monitor identifier. The tire monitor identifier may be a serial number or other unique or nearly-unique data associated with the tire monitor. For example, the tire monitor identifier may be multiple bit data stored in the tire monitor at the time of manufacture of the tire monitor. The receiver of the remote tire monitor system demodulates the received RF signals to receive the data. At block 306, the data including a tire monitor identifier, if any, is provided to a control unit of the remote tire monitor system.

Meanwhile, the same RF signals received and demodulated at blocks 302, 304 are detected at block 308. In the preferred embodiment, the RF signals are received without demodulation, for example, using a detector of the type illustrated above in conjunction with FIG. 1. Other suitable RF detectors may be used. At block 310, in response to the detected RF signals, a transmission indication is provided to the control unit. The transmission indication indicates to the control unit which RF detector of the vehicle detected the RF signals transmitted by the tire monitor and received by the receiver at block 302.

At block 312, stored identification information is retrieved from memory at the control unit. In the illustrated embodiment, the identification information is stored at a memory location associated with the transmission indication or RF detector. Thus, the control unit receives a wireline indication from a receiving RF detector that a transmission has been received. Using the wireline indication, the control unit selects the memory location from which previous identification information is retrieved.

At block 314, the control unit determines if the identifier received from the transmitting tire monitor matches the stored identification information. In this application, a match may mean a bit-by-bit match of received and stored data or some other level or association between the received data and the stored data. If the data match, at block 316, the tire information such as pressure data are updated. For example, in one embodiment, tire pressure data are stored along with the identification information for the tire monitor. If the received tire pressure data varies by a predetermined amount from the stored tire pressure data, the received tire pressure data is stored and an alarm or other user indication is generated.

At block 318, if there is no match between the received identifier and the stored identification information, the method waits for receipt of an additional transmission associated with this RF detector. Preferably, the tire monitor transmits pressure data and a tire monitor identifier periodically, such as once per minute. Upon receipt of a subsequent transmission, at block 320, the method attempts to verify the previously received tire monitor identifier. This is done by comparing the newly received tire monitor identifier and the previously received tire monitor identifier to determine if there was an error in communication of the previously received tire monitor identifier. In some embodiments, multiple subsequent transmissions may be received for comparison. If there is no verification, at block 322, the mismatched transmission received at block 302 is discarded. This condition indicates that the same tire monitor continues to transmit, and the mismatched transmission was received with an error.

If at block 320 the newly received data verify the previously received data, the identification information stored for this RF detector is updated with the tire monitor identifier from the received transmission. This condition indicates that the tire monitor has been changed and is communicating reliably. In this manner, the illustrated system and method provide automatic update capability after a tire monitor has been changed. This may occur if the tires of the vehicle are rotated or if one or more tires is replaced. There is thus no need to manually intervene for the remote tire monitor system to update the identities and locations of the tire monitors on the vehicle.

Figure 4:
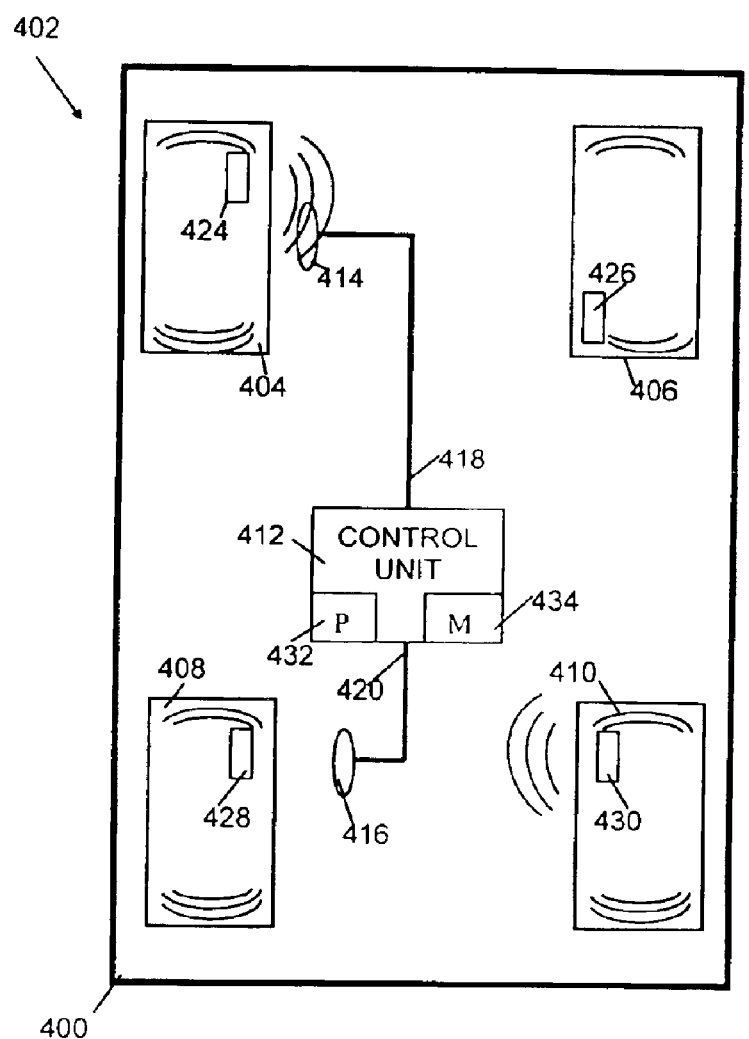
FIG. 4 is a block diagram of a vehicle with a remote tire monitor system.

FIG. 4 is a block diagram of a vehicle 400 with a remote tire monitor system 402. In the exemplary embodiment of FIG. 4, the vehicle 402 includes wheels 404, 406, 408, 410. Each wheel includes a tire mounted on a rim. In other embodiments, the vehicle 400 may have other numbers of wheels. For example, in one particular embodiment, a truck has 18 wheels.

The remote tire monitor system 402 includes a control unit 412, a front detector 414 and a rear detector 416. The front detector 414 is electrically coupled to the control unit 412 by a cable 418. Similarly, the rear detector 416 is electrically coupled to the control unit 412 by a cable 420.

The remote tire monitor system 402 further includes a tire monitor associated with each wheel of the vehicle 400. Thus, a tire monitor 424 is associated with wheel 404; tire monitor 426 is associated with wheel 406; tire monitor 428 is associated with wheel 408; and tire monitor 430 is associated with wheel 410. The tire monitors are generally of the type described herein and are configured to detect a tire condition such as tire pressure and to occasionally transmit a transmission including tire data, such as tire pressure data and identification information uniquely identifying the respective tire monitor.

In the illustrated embodiment, the front detector 414 is positioned proximate the left front wheel 404. For example, the front detector 414 may be mounted in the wheel well adjacent the wheel 404. Similarly, the rear detector 416 is positioned near the left rear wheel 408, such as in the wheel well adjacent the wheel 408. With this mounting configuration, the front detector 414 is positioned to detect transmissions from the pair of tire monitors 424, 426 associated with the front wheels 404, 406. The front detector 414 is proximate the left front tire monitor 424 and distal the right front tire monitor 426. Similarly, the rear detector 416 is positioned to detect transmissions from the left rear tire monitor 428 and the right rear tire monitor 430. The rear detector 416 is positioned proximate the left rear tire monitor 428 and distal the right rear tire monitor 430.

The illustrated embodiment is exemplary only. In FIG. 4, the detectors 414, 416 are designated for detecting radio frequency transmissions from the front wheels 404, 406 and the rear wheels 408, 410, respectively. In alternate embodiments, the RF detectors 414, 416 may be positioned to detect RF transmissions from the left side wheels 404, 408 and the right side wheels 406, 410 respectively. Similarly, while in FIG. 4 the front detector 414 is positioned in proximity to the left front wheel 404, away from the right front wheel 406, this positioning may be reversed so that the front detector 414 is positioned near the right front wheel 406, such as in the left front wheel well. In the same way, the rear detector 416, shown in FIG. 4 in proximity to the left rear wheel 408, may be positioned in proximity to the right rear wheel 410. Actual positioning of the RF detectors 414, 416 is not important. Rather, the relative signal strength or frequency of reception of RF transmissions from tire monitors is what is measured by the detectors 414, 416 in conjunction with the control unit 412. It is important that each RF detector be positioned on one side or end of the car, away from the centerline, so that the relative signal strength or number of transmissions received by the RF detector from each of its associated pair of tire monitors can be determined.

The control unit 412 includes a receiver to receive radio frequency transmissions from tire monitors of the tire monitor system 402, a controller 432 and a memory device 434. The controller 432 forms a processing means and may be any suitable control device such as a microprocessor, microcontroller, application specific integrated circuit (ASIC) or logic device coupled together to perform the necessary functions described herein.

The memory device 434 forms a memory means for storing data and preferably is formed of semiconductor memory. In the illustrated embodiment, the memory device of the control unit 412 includes persistent memory or nonvolatile memory such as an E$^2$PROM, and working memory such as random access memory (RAM). For example, the persistent memory may be used to stored tire identifiers and pressure data over extended periods of time, such as when the vehicle 400 is parked. The RAM may be organized as an array which stores counter values associated with tire monitor identifiers and tire monitor positions, as will be described in greater detail below.

Figure 5:
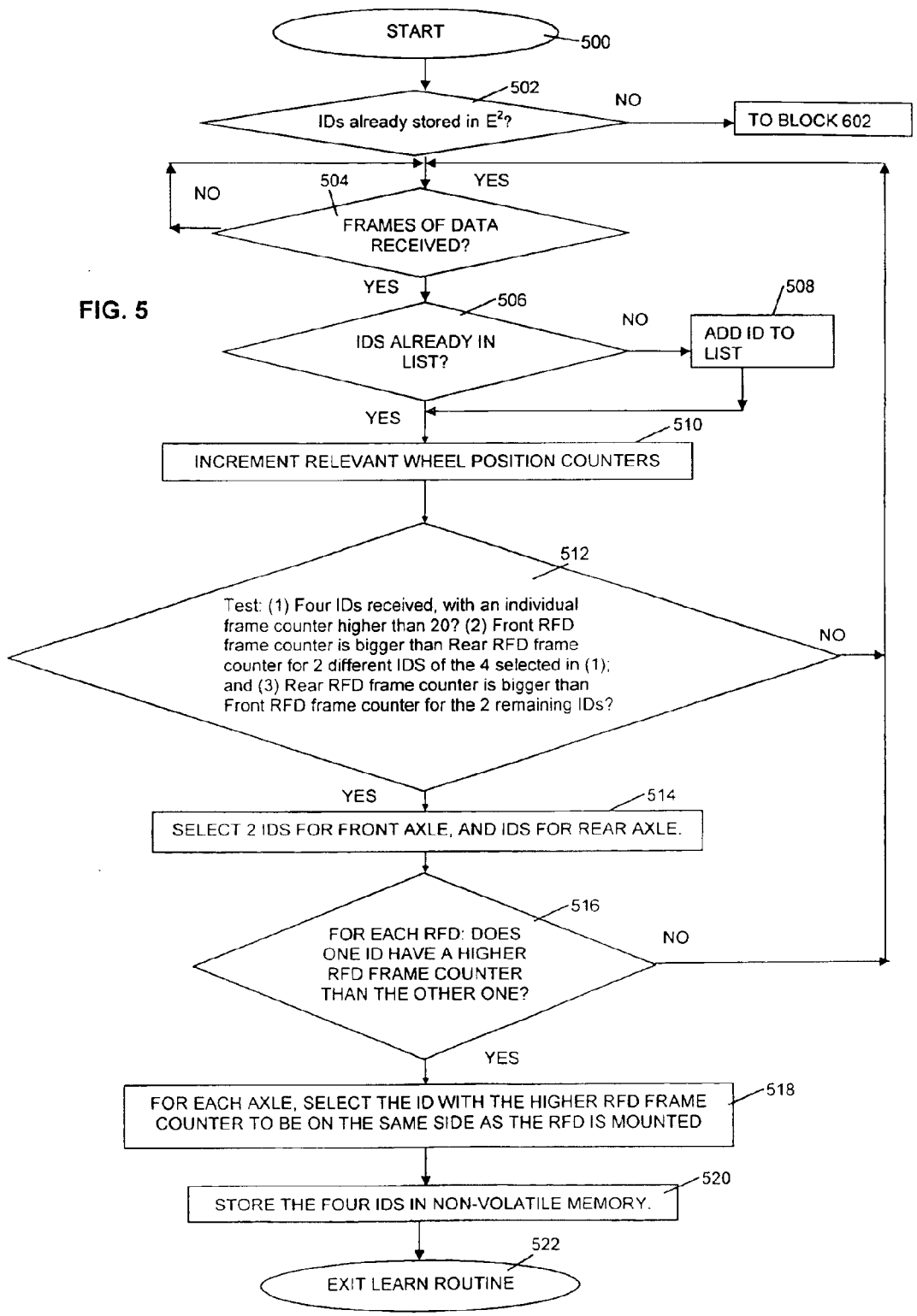
FIGS. 5 and 6 and are a flow diagram illustrating one embodiment of a remote tire monitor system.

FIG. 5 is a flow diagram illustrating operation of one embodiment of a remote tire monitor system. The method illustrated in FIG. 5 may be used in conjunction with a remote tire monitor system of the type illustrated in FIG. 4.

The method embodiment in FIG. 5 allows a control unit of such a system to automatically learn the positions of the tire monitors of the system on the vehicle, referred to as a learn method or learn routine. This determination is made after receiving several transmitted frames of tire data from the respective tire monitors of the system. The control unit establishes an array of data in working memory and uses the data of the array to determine the position information for each tire monitor in the system. An example array of data is illustrated below.

|     | FrontRFD | Rear RFD | TotalRF_Frame Counter |
| --- | --- | --- | --- |
| id1 | 22 | 2 | 22 |
| id2 | 12 | 4 | 23 |
| id3 | 2 | 20 | 20 |
| id4 | 1 | 10 | 20 |

In this example, rows of the array are defined by the identification information for each tire monitor from which data are received. In the example above, the identification information is listed as "id1," "id2," etc. However, in a more typical example, the identification information will be a numeric value forming a unique identifier or identification code of a transmitting tire monitor. The identification code is typically transmitted along with the tire pressure or other tire data by the tire monitor in a transmission frame. The exemplary array is shown with four rows, one for each tire monitor of the vehicle in this example. The array may also be formatted with additional rows to record data for additional transmitting tire monitors whose transmissions are received by the controller.

In the example array above, the columns of the array correspond to frame counter values which count the number of frames received at the respective RF detector of the system. Thus, in this example, a frame labeled with tire monitor identifier id1 has been received at the front RF detector 22 times. A frame with the same identifier id1 has been received at the rear RF detector two times, and so on. The count label TotalRF_FrameCounter is a count of the total number of frames received by the receiver of the controller from the identified tire monitor. The total frame counts recorded in this column is always greater than or equal to an RFD frame counter because the receiver has greater sensitivity than the RF detectors and detects transmissions that are missed by the RF detectors.

The method of FIG. 5 begins at block 500. The method of FIG. 5 shows the learn routine on the production line, when the tires of the vehicle are first assembled with the tire monitors and added to the remote tire monitor system. At block 502, it is determined if tire identifiers are already stored in electrically erasable (E$^2$) memory. This memory is nonvolatile or persistent memory which retains data stored therein even when power is removed from the memory. In the illustrated system, after installation on a vehicle, the persistent memory is empty. As soon as tire identifiers are received and verified according to the procedure of FIG. 5, the tire monitors are stored in the persistent memory. Thus, block 502 determines if this is the first time the tire monitor system has been operated after installation on a vehicle. If so, no tire monitor identifiers will be stored in the persistent memory and the "no" path will follow to block 504. If tire identifiers are already stored in the persistent memory, the "yes" path is followed to block 602.

At block 504, it is determined if a frame of data has been received. If not, control remains in a loop including block 504 until a frame of data have been received. As indicated above, each frame of data transmitted by a tire monitor typically includes data corresponding to the tire identifier which uniquely identifies the transmitting tire monitor and tire data, such as data corresponding to the measured tire pressure of the tire. Other information, such as a header or synchronization data may be transmitted as well.

Once a frame of data has been received at block 504, the tire monitor identifier contained in the frame of data is extracted and compared with other already-received identifiers stored in the list in working memory. If the extracted tire identifier is not present in the list, block 506, it is added to the list, block 508. Control then proceeds to block 510, where the relevant wheel position counters are incremented. As noted above, each identifier has three associated counters. One counter each is associated with each RF detector of the system and stores data corresponding to the number of transmissions detected by that respective RF detector. The third counter counts the total frames received from an identified tire monitor, and is incremented after a frame is received at the receiver of the controller. Thus, the relevant wheel position counters that are incremented at block 510 include the total RF frame counter and the frame counter corresponding to the front RF detector or the rear RF detector.

At block 512, a test is performed to determine if the specified criteria have been fulfilled. First, it is determined if four tire identifiers in the list have Total RF Frame counter values that are greater than a predetermined number, 20 in this example. That is, before applying the pass criteria, at least four tire identifier counters must have a value of 20 or greater. This test is implemented to ensure that there is a strong signal from a tire monitor and to eliminate any wrong or incorrect tire identifiers being added to the system. If the received signal from a tire monitor is weak, it will likely be received only a few times, rather than 20 or more times. Any other suitable number may be substituted for the predetermined number 20. Reducing the number will increase the speed at which the tire monitor positioning is learned by the system, but may increase the likelihood of incorrect tire monitor position learning.

According to the second criterion of the illustrated embodiment, the counter for the front RF detector must be larger than the counter for the rear RF detector for two different tire identifiers out of the four. According to the third criterion, it is determined if the frame counter for the rear RF detector stores a value larger than the front RF detector frame counter for the two remaining tire identifiers in the list. If these criteria are not fulfilled using the tire identifiers in the list, control returns to the block 504 to await receipt of additional frame of data.

If these three criteria are fulfilled, however, at block 514, two tire identifiers are selected from the list for the front axle of the vehicle, according to the second criterion above, and two tire identifiers are selected from the list for the rear axle, according to the third criterion above. Thus, at block 518, the method has chosen four tire identifiers with a total RF frame counter value higher than 20 and has distinguished the selected tire identifiers between the front of the vehicle and the rear of the vehicle by using the front frame counter value and rear frame counter value. For example, using the values shown in the example list above, the tire identifiers corresponding to the tire monitors positioned at the front of a vehicle are tire identifiers id1 and id2. The tire identifiers corresponding to tire monitors positioned at the rear of the vehicle are id3 and id4.

Beginning at block 516, the method identifies the right and left tire monitor for each axle. First it is determined if, among the identified tire identifiers from the list for each of the front and rear axles, one RF detector counter value has a higher frame counter value than the other. If not, the method cannot distinguish the two tire monitors on the axle. Control returns to block 504 to await receipt of additional frames of data. If the criterion of block 516 is met, at block 518 the tire indicator with the higher RF detector frame counter value is selected to be on the same side of the vehicle as the RF detector for that end of the vehicle. Thus, in FIG. 4, among the front wheels 404, 406, the tire identifier associated with the larger valued RF detector counter is selected to correspond to tire monitor 426. Similarly, the tire identifier having the lower valued RF detector counter value is selected to be associated with the tire monitor 424. Alternatively, if, as is suggested in FIG. 5, those RF detectors 414 and 416 are positioned on the left side of the vehicle 400, then of the tires of tire identifier selected at block 514, the larger valued RF detector frame counter is associated with the left-hand side tire monitor for both axles. In the illustration of FIG. 4, if the RF detector 414 were instead mounted on the left-hand side of the vehicle 400, the larger valued tire identifier would be selected to be associated with tire monitor 424 and the larger valued RF detector frame counter would be selected to be associated with tire monitor 428. Using the example list of data above, and assuming that both tire monitors are on the left-hand side of the vehicle, the method would select id1 for the left front tire monitor and id2 for the right front tire monitor. Similarly, the method would select id3 for the left rear tire monitor and id4 for the right rear tire monitor.

At block 520, the four selected tire identifiers are stored in non-volatile memory such as the $E^2PROM$ or other persistent memory described above. During subsequent operation of the tire monitor system, as new frames of tire data are received, the tire identification information contained in the frame will be compared with one of the selected in store for tire identifiers. If there is a match, the tire pressure information or other tire data contained in the frame will be used to update the current tire pressure information. At block 522, the learn routine illustrated in FIG. 5 is exited and the method of FIG. 5 terminates.

Figure 6:
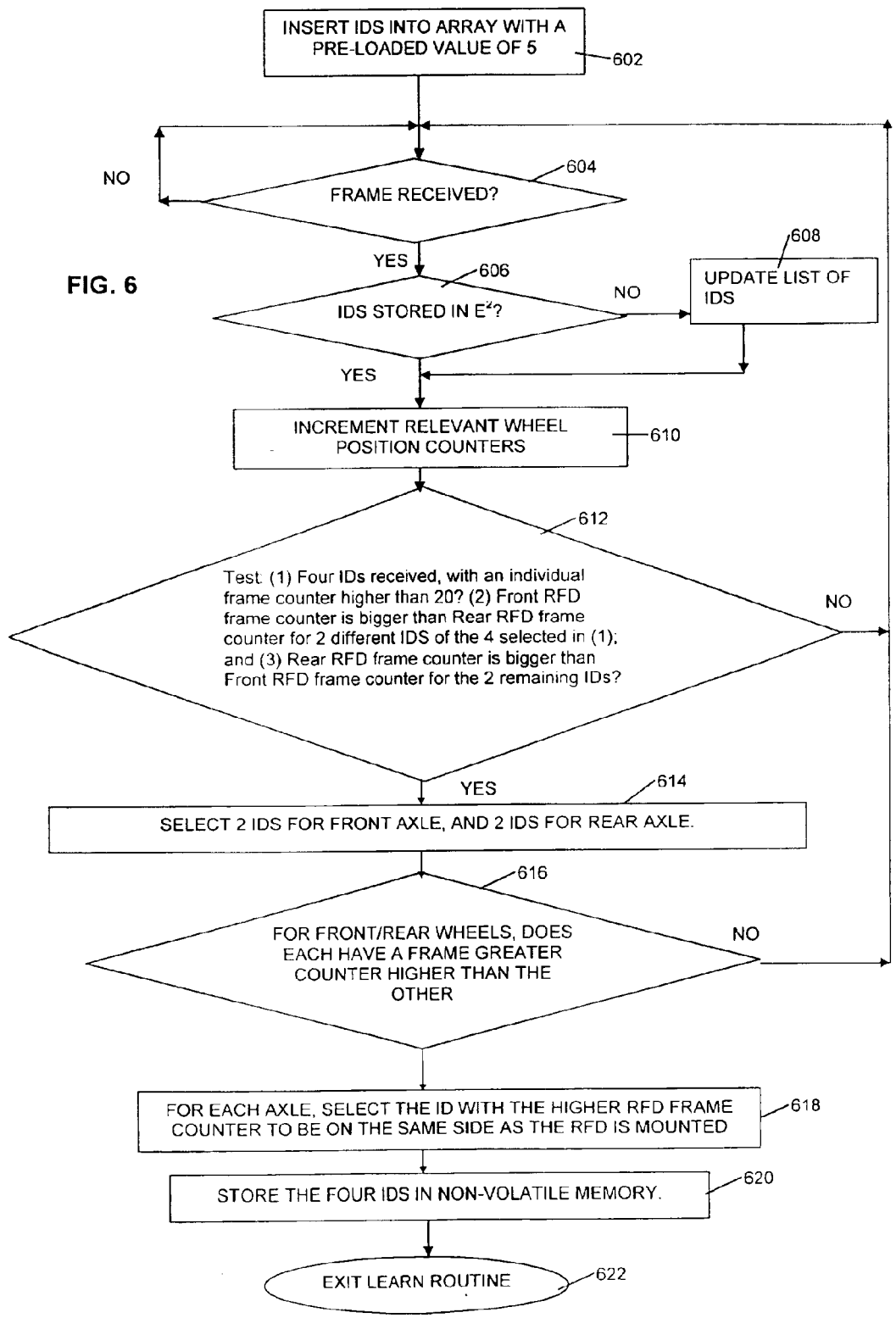

FIG. 6 illustrates a method for the remote tire monitor system to learn the positioning of tire monitors on a vehicle during a normal driving operation. The method begins at block 602, which is accessed after determining at block 502 (FIG. 5) that tire monitor identifiers have already been stored in the persistent memory of the system.

At block 602, the tire monitor values stored in the persistent memory are inserted into the list or array in working memory. The Total RF Frame Counter, the front RF detector counter value (for identifiers which were in the front) and the rear RF detector counter value (for identifiers which were in the rear) for each of these array entries is preloaded with a predetermined value, such as 5. Storing preloaded values such as this gives a weighting to the tire identifiers already stored in the persistent memory and copied into the working memory array. The benefit of weighting the preloaded tire monitor values in the array in this manner is to reduce the likelihood that a tire monitor on an adjacent vehicle will be detected and selected as one of the four tire monitors of the vehicle. This could occur, for example, if more than one vehicle with comparable systems are parked adjacent each other, such as the end of an assembly line or in another location. Further, weighting the preloaded tire monitor values reduces the time required for the learn process so that reliable information can be given to the driver sooner. This process happens every time the vehicle is started and a new journey is begun.

At block 604, it is determined if a frame of data has been received. If not, control remains in a loop including block 604 until a frame of data is received. Once a frame of data has been received, control proceeds to block 606.

At block 606 it is determined if the tire monitor identifier contained in the received frame is already stored in the persistent memory or E²PROM. If not, at block 608 the received tire monitor identifier is added to the working list of tire identifiers in working memory. Control proceeds to block 610.

At block 610, the relevant wheel position counters are incremented. Operation here is similar to the operation at block 510, FIG. 5. The working list of data includes columns for each of the front and rear RF detector counters and a total RF frame counter. At block 610, the total RF frame counter corresponding to the received tire identifier is incremented. Also at block 610, the counter corresponding to the front or rear RF detector is incremented, depending on which RF detector sensed or detected the transmission from the transmitting tire monitor.

At block 612, three criteria are tested to determine if sufficient frames of data have been received to reliably distinguish front from rear tire monitor positions. Operation of block 612 is similar to the operation of block 512, FIG. 5. At block 614, two tire identifiers are selected to correspond to the front end of the vehicle and two tire identifiers are selected to correspond to the rear end of the vehicle. At block 612, if all three criteria are not fulfilled, control returns to block 604 to await the receipt of additional frames of data.

At block 616, it is determined if, for each of the front and rear sets of tire monitors, one tire monitor has a higher RF detector counter value. If not, control returns to block 604 to await the receipt of additional data. If so, at block 618, the front and rear selected tire monitor pairs are each sorted among right and left tire monitors, selecting a left front, right front, left rear and right rear tire monitor. At block 620, the four tire monitor identifiers are stored in non-volatile or persistent memory, along with position information for the tire monitor. The learn routine of FIG. 6 is then exited at 622.

Figure 7:
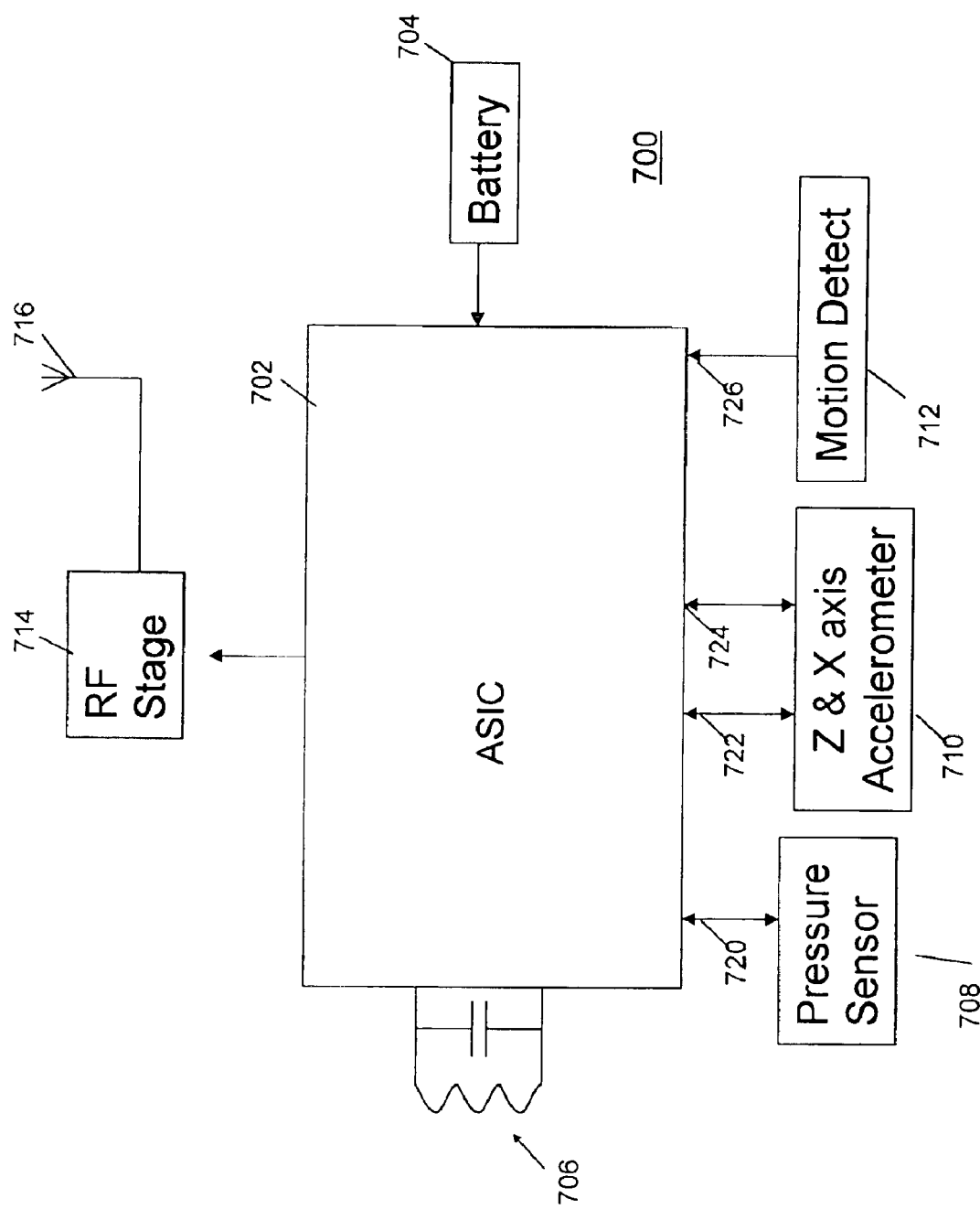
FIG. 7 is a block diagram of an embodiment of a tire monitor.

FIG. 7 is a block diagram of a tire monitor 700 in accordance with a further embodiment of the present invention. The tire monitor 700 includes a controller 702, a battery 704, a transponder coil 706, a pressure sensor 708, an accelerometer 710, a motion detector 712, an RF stage 714 and an antenna 716. It is envisioned that each wheel or tire of a vehicle will have a tire monitor such as the tire monitor 700 associated with it to monitor tire conditions such as tire pressure. The tire monitors are actuated in part by signals produced by the accelerometer and are controlled by the controller 702. The controller 702 determines positioning of the tire monitor, for example, on the left side or the right side of the vehicle, based on the signals produced by the accelerometer. The controller 702 thus forms a tire monitor position information determining circuit which is responsive to a acceleration signal from the accelerometer. The controller 702 forms a control circuit configured to determine position information about position of the tire monitor on the vehicle in response to an acceleration signal from the accelerometer 710.

The controller 702 may be any suitable processor, microprocessor, microcontroller or other suitable data processing device for performing the functions described herein. In one embodiment, the controller 702 is configured as an application specific integrated circuit (ASIC). The ASIC is designed using pre-existing circuit blocks which are capable of performing the necessary functions, either alone or in conjunction with controlling software. The processor generally further includes memory for storing data in instructions for use in conjunction with received and generated data.

The battery 704 provides operating power for the tire monitor 700, including the controller 704. The battery 704 may be replaceable or may be permanently installed.

The transponder coil 706 is configured for actuation in response to electromagnetic energy imparted from external to the tire monitor 700. In response to the RF energy, the transponder coil produces a voltage or current signal which may be detected by the controller 702. Communication with the controller 702 using a transponder coil in this matter is known for actuating operation of a tire monitor such as the tire monitor 700 or for communicating data or other information produced at the tire monitor 700. In the illustrated embodiment, the transponder coil 706 may detect a programming actuation produced by bringing an exciter into the vicinity of the transponder coil 706. The exciter actuates the transponder coil to produce a signal detectable by the controller 702. This may cause the controller, for example, to transmit tire information in a manner to be described below. This initial transmission of tire information may then be used to program the control unit of a remote tire monitoring system of the type described herein.

The pressure sensor 708 forms a sensing device for detecting a tire condition and producing tire data in response thereto. In the illustrated embodiment, the pressure sensor 708 detects the pneumatic air pressure of the tire with which the tire monitor 700 is associated. In alternate embodiments, the pressure sensor 708 may be supplemented with or replace by a temperature sensor or other devices for detecting tire data. An indication of the tire data is provided by the controller 702 at an input 720.

The accelerometer 710 forms a rotational sensor for the tire monitor 700. In the preferred embodiment, the accelerometer is a dual axis accelerometer but any multiple axis accelerometer may be used. Alternatively, two or more single axis accelerometers may be substituted to perform the same function of the accelerometer 710. One example of a suitable accelerometer is any of the dual axis accelerometers produced by Memsic, Inc., Andover, Mass. The dual axis accelerometer determines first acceleration along a first axis and second acceleration along a second axis. As will be described below in conjunction with FIGS. 8–11, during operation, the first axis and the second axis lie in a rotational plane of the respective tire with which the tire monitor 700 is associated. The tire monitor 700 and its associated wheel rotate about a third axis which is orthogonal to the first axis and the second axis.

Operation of the tire monitor in conjunction with the accelerometer 710 will be described below in conjunction with FIGS. 8 through 11. The exemplary accelerometer has no mechanical moving parts but works on a principle of air convection to determine acceleration along two orthogonal axis. The accelerometer 710 produces a signal at an input 722 of the controller 702. In one embodiment, this signal is an analog voltage proportional to the acceleration detected by the accelerometer 710. In another embodiment, this signal includes a first axis acceleration signal representative of acceleration along a first axis and a second axis acceleration signal representative of acceleration along a second axis. The output signal may be a voltage or a current or may be an analog signal, a digital signal or a ratiometric signal. At an output 724, the controller 702 provides a power control signal to the accelerometer to turn on and turn off the accelerometer 710 under control of the controller 702.

The motion detector 712 provides an indication at an input 726 of the controller 702 when the tire monitor is in motion due to rolling of the tire with which the tire monitor 700 is associated. The motion detector 712 may also be referred as a roll switch. In some embodiments, the motion detector 712 produces the indication when the speed of the vehicle exceeds a predetermined threshold, such as 15 miles per hour. In other embodiments, as will be described below, the motion detector 712 may be omitted or its function combined with that of the accelerometer 710.

The RF stage 714 includes circuitry necessary for transmitting radio frequency signals conveying tire data, identification data, status data and other information from the tire monitor 700. The antenna 716 is electrically coupled with the RF stage 714 to facilitate RF transmission. In one embodiment, the valve stem is used as the antenna 716. In the preferred embodiment, the RF stage 714 transmits radio signals to communicate data representative of the position information determined for the tire monitor, such as positioning of the tire monitor 700 on the right or left side of the vehicle. The RF stage 714 thus forms a position information radio transmitting circuit.

Figure 8:
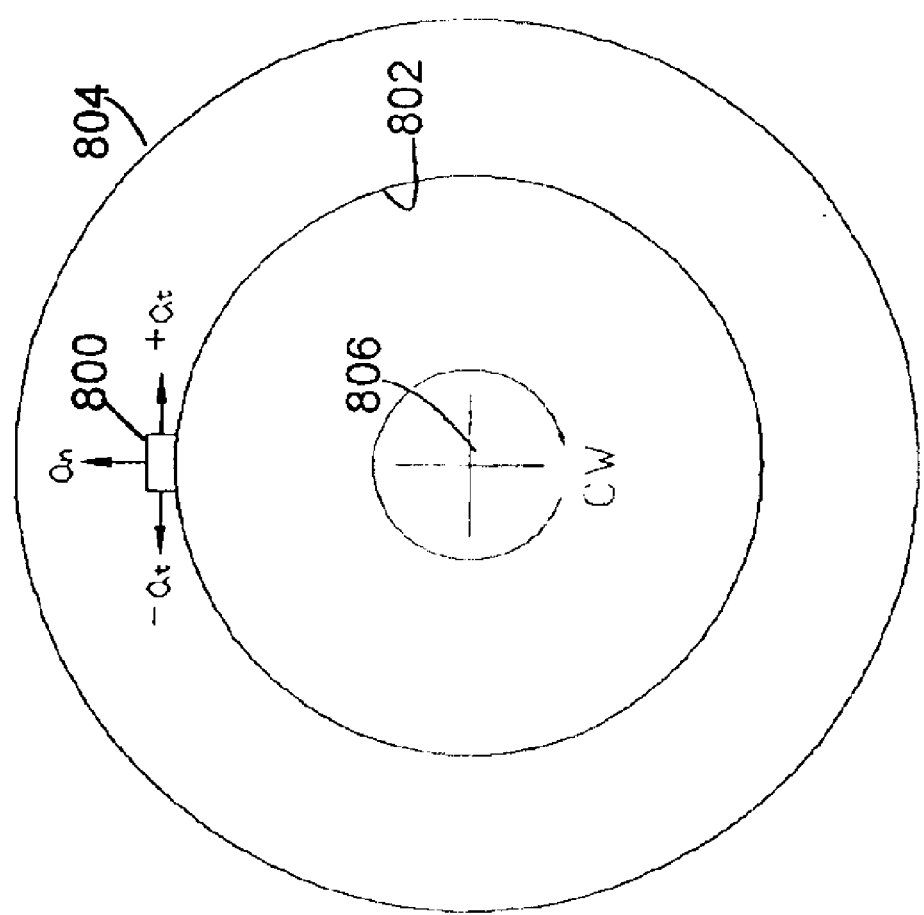
FIGS. 8-12 illustrate acceleration experienced by the tire monitor of FIG. 7.

FIG. 8 illustrates acceleration experienced by a tire monitor such as the tire monitor 700 of FIG. 7. FIG. 8 illustrates a tire monitor 800 mounted on a wheel 802 associated with a tire 804. The wheel 802 and tire spin about a hub 806 in either a clockwise direction or a counterclockwise direction. Rotation in the clockwise (CW) direction is illustrated in FIG. 8. As is further illustrated in FIG. 8, the tire monitor 800 experiences two types of acceleration during rotation of the tire. Centrifugal acceleration $a_n$ which may be encountered by a tire monitor or dependent on the maximum vehicle speed and the tire and ream (rim) combination used. The required turn on speed for the tire monitor in one embodiment, indicating when the tire monitor determines that it should change state, is when the vehicle has reached a speed of approximately 15 miles per hour. The forces seen by the tire monitor at this speed can vary. Empirically, an accelerometer force of 2 G, or twice the acceleration due to gravity, is specified. The maximum acceleration seen by the accelerometer 800 will occur in certain high speed automobiles which can achieve speeds of 200 miles per hour or more, corresponding to a centrifugal acceleration $a_n$ of 1800 G at the tire monitor.

As is further illustrated in FIG. 8, the tire monitor 800 also experiences tangential acceleration, $a_t$. The tangential acceleration experienced by the tire monitor is, in contrast to centrifugal acceleration $a_n$, very small in magnitude. Exemplary values are fractions of a G force. Also, such tangential accelerations may last for only short durations.

Figure 9:
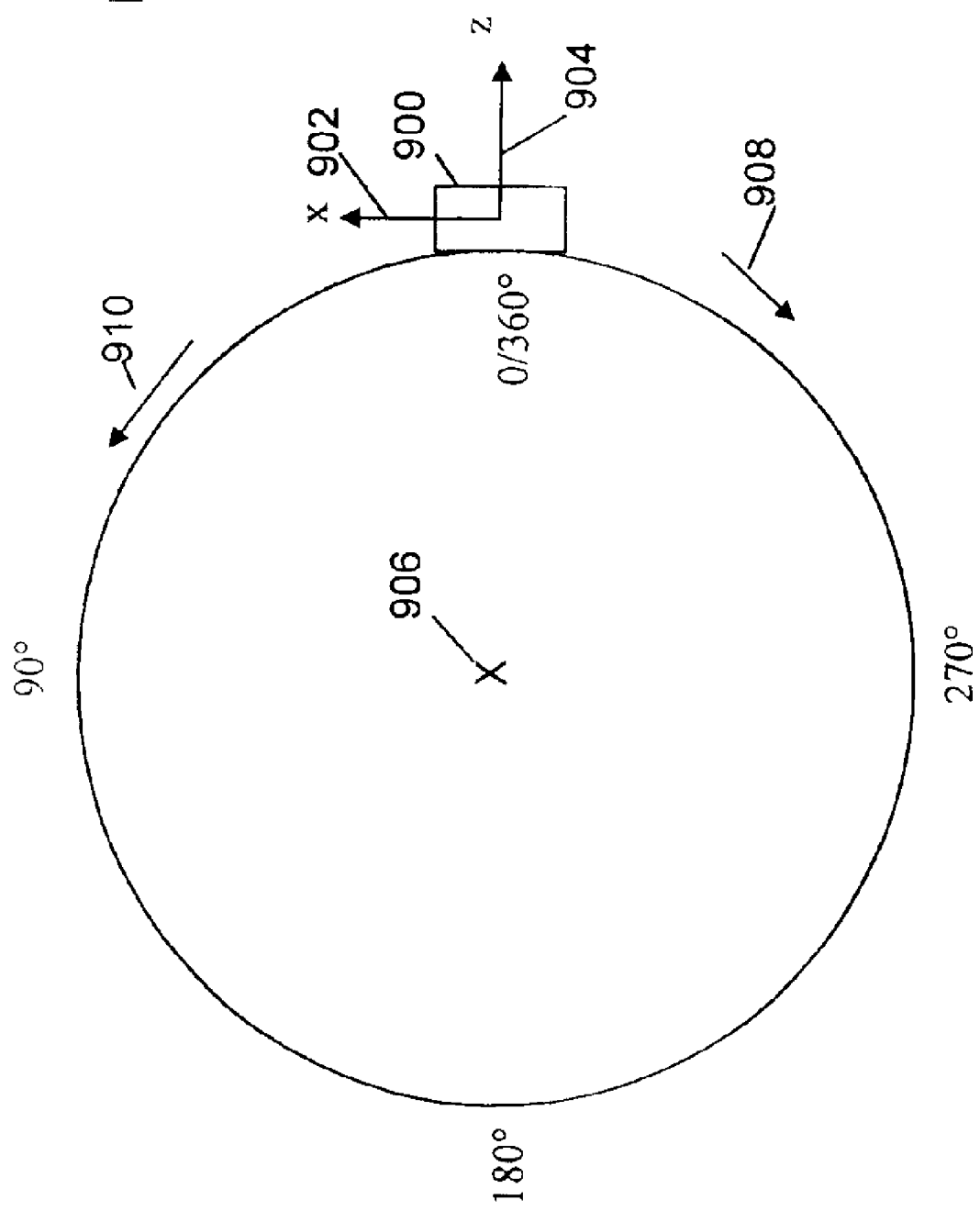

FIG. 9 further illustrates acceleration in a tire monitor 900 such as the tire monitor of FIG. 7. The tire monitor 900 includes a dual axis accelerometer which is sensitive to acceleration along two orthogonal axes. As shown in FIG. 9, these include an x axis 902 and a z axis 904. The accelerometer, in conjunction with the tire monitor 900 rotates about the center 906 of the wheel on which the tire monitor 900 is mounted. A y axis extends through the center 906, perpendicular to the plane of the page and orthogonal to the x axis 902 and the z axis 904. As the wheel turns, the tire monitor 900 moves in one of a clockwise direction 908 and a counterclockwise direction 910.

Figure 11:
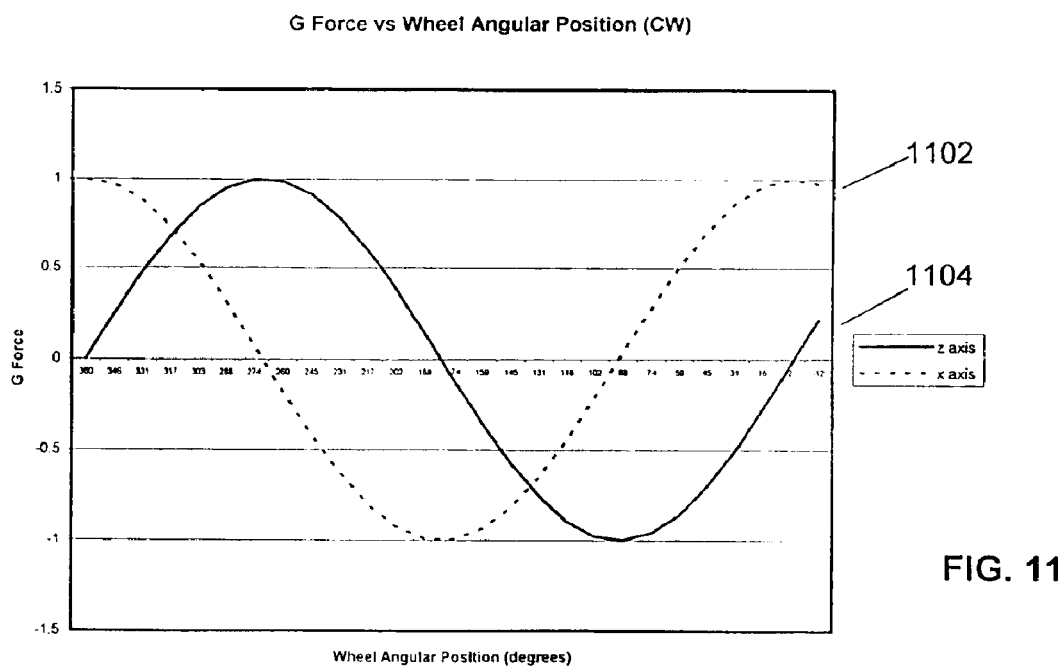
Figure 12:
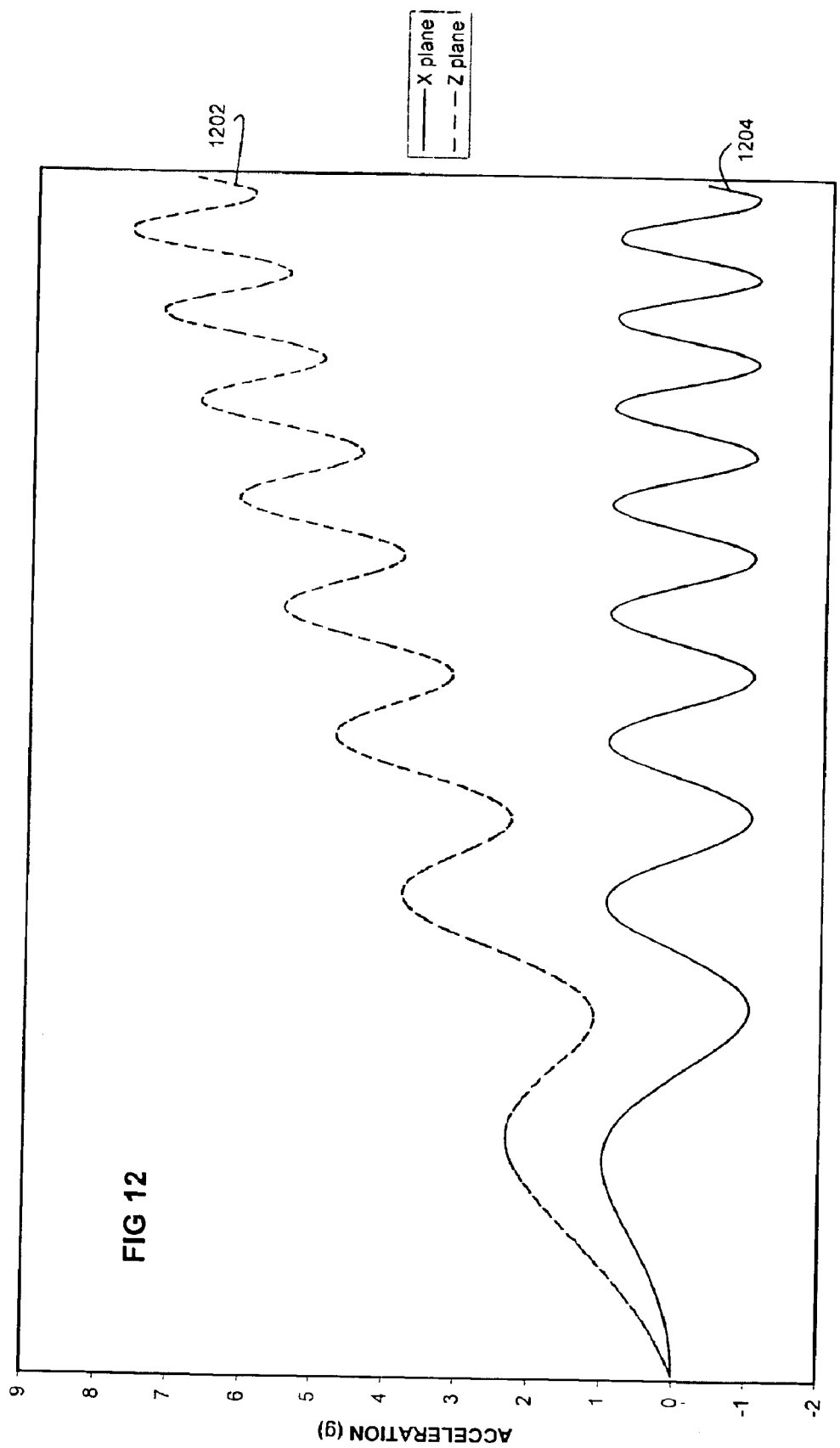

The accelerometer 900 is placed on the tire monitor with its sensitive axis oriented as shown in FIG. 9. As the vehicle moves forward, the tire monitor 900 and the two perpendicular axes of the accelerometer will rotate around the y axis or wheel axis at the wheel center 906. In the embodiment in which an accelerometer producing an analog output signal is used, each output signal of the accelerometer, one output per axis, will produce a sine wave. This sine wave describes acceleration due to gravity plus the centrifugal or tangential acceleration components. The two sine waves are illustrated in FIGS. 11 and 12. The dual axis accelerometer 900 will produce first and second axis acceleration signals having a sine wave characteristic such as that illustrated in the drawing figures.

Figure 10:
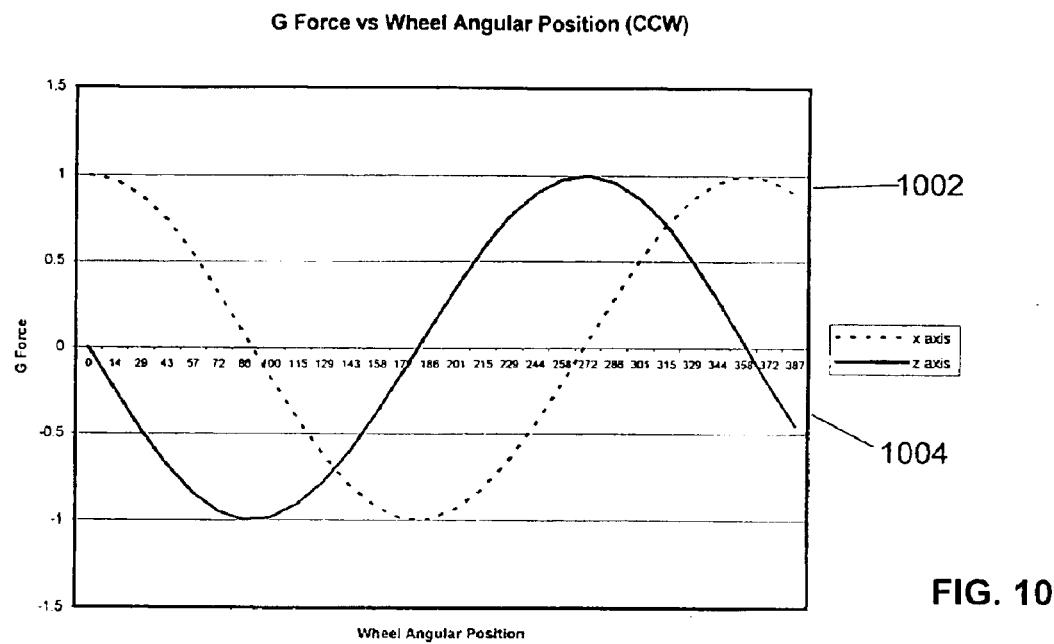

FIG. 10 is a diagram showing acceleration or G force versus wheel angular position when the wheel is moving in a counterclockwise (CCW) direction. FIG. 10 shows acceleration along the x axis 1002 and the z axis 1004. Similarly, FIG. 11 shows acceleration or G force versus wheel angular position when the wheel is moving in a clockwise (CW) direction. FIG. 11 shows acceleration along the x axis 1102 and acceleration along the z axis 1104. In both FIG. 10 and FIG. 11 the maximum acceleration detected by the accelerometer is approximately plus or minus 1 G or 1 times the acceleration due to gravity. As noted above, in typical applications, the actual acceleration experienced in a moving wheel may be much larger or much smaller than this amount.

FIG. 12 shows the AC component of the forces on both accelerometer planes as the vehicle accelerates. Force on the X plane is plotted as line 1204. Force on the Z plane is plotted as line 1202. Both accelerations start out at a substantially 0 value and increase to a generally constant AC value. The Z plane, line 1202, has an offset proportional to the speed of the vehicle due to centrifugal force.

From FIG. 10 and FIG. 11, it can be seen that, as the wheel rotates, the two waveforms produced by the dual axis accelerometer are out of phase by 90 degrees. Depending on the direction of rotation of the wheel, clockwise or counterclockwise, one axis will lead or lag the other axis. Thus, in FIG. 10, showing rotation in a counterclockwise direction, acceleration along the z axis 1004 leads acceleration along the x axis by approximately 90 degrees. Similarly, in FIG. 11, acceleration along the x axis 1102 leads the acceleration along the z axis 1104 by approximately 90 degrees.

In the illustrated embodiment, the accelerometer converts the acceleration it detects into a signal such as a voltage waveform. This signal, including a first signal for acceleration on one axis and a second signal for acceleration on a second axis, can then be sampled by the controller of the tire monitor. Position information about position of a tire including the tire monitor can then be determined based on the signal. A decision can subsequently be made as to whether the tire monitor is rotating in a clockwise or counterclockwise direction, based on the sampled signal from the accelerometer. The position information, such as right hand side positioning or left hand side positioning can be determined from the direction of rotation.

For example, the controller of the tire monitor can determine a lag/lead relationship of the first acceleration signal for the x axis and the second acceleration signal of the z axis. The controller determines whether the x axis signal leads or lags the z axis signal. This lag/lead information will indicate either clockwise or counterclockwise rotation for the wheel or tire associated with the tire monitor Based on the clockwise or counterclockwise rotation information, and information that the vehicle is traveling forward rather than backing up, the controller can determine whether the tire monitor is on the right-hand side or the left-hand side of the vehicle. As illustrated in FIG. 12, the z axis will have a centrifugal force offset. However, for directional rotation, the disclosed method and apparatus only look at the alternating +1 g/−1 g component. Accordingly, FIGS. 10 and 11 do not illustrated all acceleration components seen at the output of the z axis accelerometer but are representative of the alternating component. Operation of the tire monitor will be described in greater detail below in conjunction with FIGS. 14 and 15.

Figure 13:
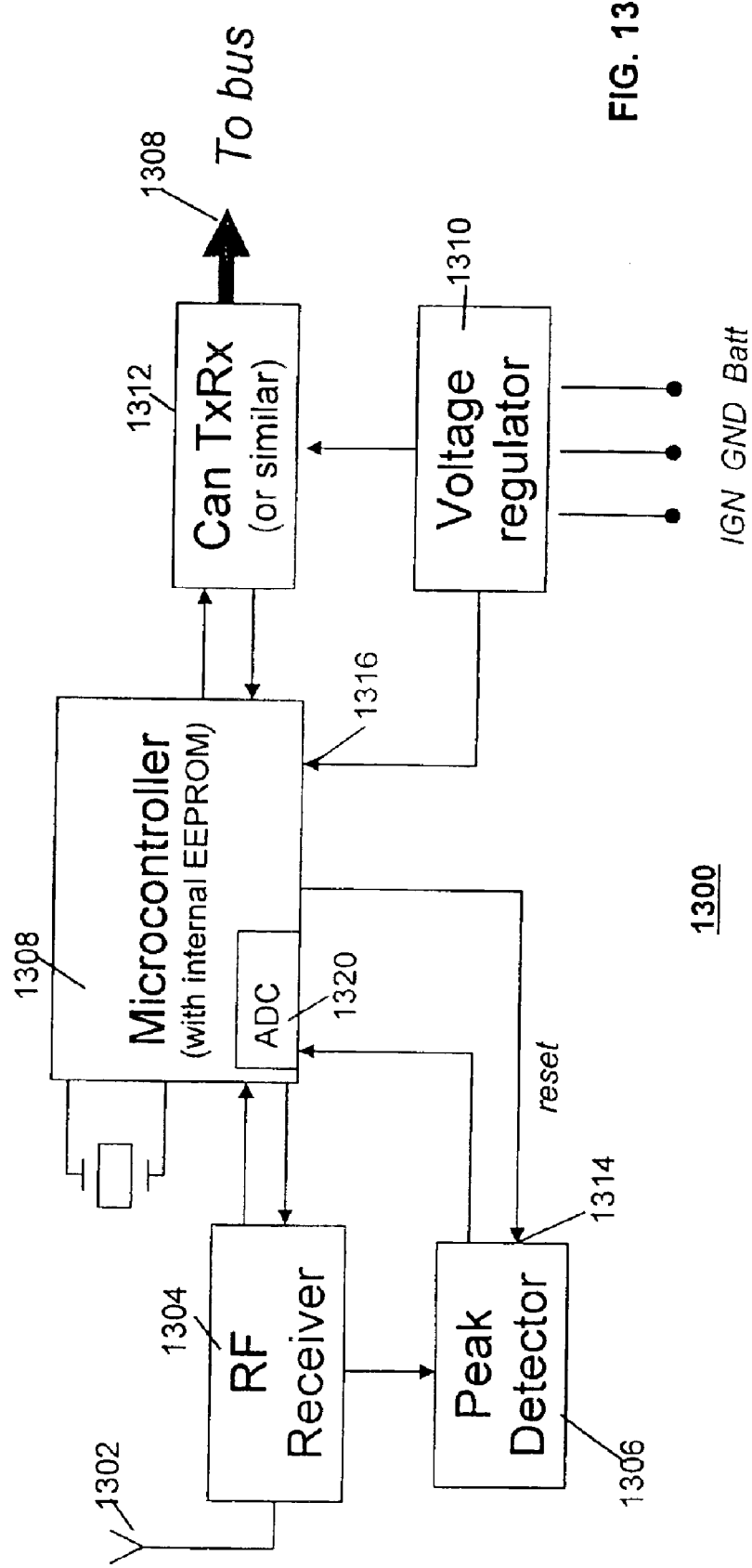
FIG. 13 is a block diagram of a control unit of a remote tire monitor system.

FIG. 13 is a block diagram illustrating one embodiment of a control unit 1300 for use in conjunction with the remote tire pressure monitoring system described herein. The control unit 1300 is preferably mounted in a convenient location of the vehicle, such as in the dash near the front of the vehicle or in the trunk near the rear of the vehicle. The control unit 1300 includes an antenna 1302, a radio frequency (RF) receiver 1304, a peak detector 1306, a microcontroller 1308, a voltage regulator 1310 and a communication interface circuit 1312.

The control unit 1300 receives transmissions from the plurality of tire monitors of the vehicle. These transmissions may be encoded or modulated in any suitable format according to any suitable technique. In one embodiment, each transmission is in the form of a frame or word of encoded digital data. The data are organized as data fields. In one example, the data includes a plurality of status bits conveying status or function data, identifier bits conveying identification information for the transmitting tire monitor, pressure bits conveying measured tire pressure, temperature bits conveying measure tire temperature and error checking bits. Some of these data fields may be omitted or other data may be substituted.

The antenna 1302 and the RF receiver 1304 operate together to receive radio frequency transmissions from tire monitors of the remote tire monitoring system. As indicated herein, the respective tire monitors transmit information including tire data, identification data and status information from time to time. The RF receiver 1304 includes a received signal strength indicator (RSSI) circuit and demodulating and decoding circuitry. The demodulating and decoding circuitry operate to extract the transmitted information from the received RF signals. This information, in one embodiment, includes tire data, identification data for the transmitting tire monitor and status data. The status data in one embodiment includes position information such as left/right position information determined by the transmitting tire monitor. Thus, the RF receive 1304 forms position information radio receiving circuit. The recovered data is provided to the controller 1208 for further operation.

The received signal strength indicator circuit produces a signal related to the received signal strength of the RF transmission received at the RF receiver 1304. Any conventional RSSI circuit can be used. The RSSI circuit provides an RSSI indication to the peak detector 1306. One embodiment of the peak detector 1306 will be described below in conjunction with FIG. 14.

The peak detector 1306 provides a peak signal to the microcontroller 1308. In the illustrated embodiment, the microcontroller includes an analog-to-digital (ADC) 1320 which samples the peak received signal strength provided by the peak detector 1306 after a word or frame of data has been received by the RF receiver 1304. The ADC 1320 thus produces a digital value of the peak received signal strength during the transmission of the frame.

The peak detector 1306 includes a reset input 1314. At the very beginning of each frame of data, a reset signal is applied to the reset input 1314 by the controller 1308 to reset the peak detector. This operates to reject any influence of other RF noise sources. The peak data may be associated with other information received by the RF receiver, such as the identification data for the transmitting tire monitor. This data may then be stored for subsequent use.

In the illustrated embodiment, the controller 1308 develops a running average of the peak RSSI values for each wheel. This is done by, for example, retrieving stored peak data associated with the tire monitor identifier received with each transmission, developing an average and storing the average value. As additional transmissions are received from each tire monitor, the running average for that respective tire monitor is updated.

Based on the running average, the controller 1308 makes a decision of whether the transmitting tire monitor is positioned on a front or a rear wheel of the vehicle. For example, if the RF receiver 1304 and antenna 1302 are positioned closer to the front wheels of the vehicle, such as in the dash, the received signal strength from the front wheels will be greater when received at that location than the received signal strength from the rear wheels. Therefore, the average peak value will be greater for two wheels, corresponding to the front wheels. Conversely, if the antenna 1302 and RF receiver 1304 are positioned toward the rear of the vehicle, such as in the trunk, the received signal strength from the rear tires will be greater than received signal strength for the front tires. Based on the average peak detected values, the front wheels may be distinguished from the rear wheels based on their transmissions.

In alternative embodiments, other signal detectors may be used to identify strongest or weakest received signals and therefore determine front versus rear information for the transmitting tire monitors. For example, a droop detector or negative peak detector could be used to determine the weakest signal received for each wheel and the front or rear decision could be based on that information.

The illustrated embodiment has a particular advantage in that the control unit 1300 has only to determine front and rear positioning information for the left-hand side tire monitors, for example, and then for the right hand side tire monitors. In other words, assuming the control unit 1300 is located in the trunk, so that reception of transmissions from the rear wheel tire monitors is stronger, the control unit 1300 only needs to determine that the left-hand side (LHS) rear tire monitor transmission is stronger than the LHS front transmission, and that the right-hand side (RHS) rear transmission is stronger than the RHS front transmission. It does not matter if the RHS front transmission is stronger than the LHS rear transmission. The control unit, using the received signal strength information and peak detector 1306, is solely required to determine front versus rear from the received transmissions. Information about left versus right positioning is determined from the content of respective transmissions.

This advantage is provided in an embodiment in which tire monitor transmissions are received from tire monitors positioned at all wheels of the vehicle. Right/left position information for each of the tire monitors is determined to identify right side tire monitors and left side tire monitors. Subsequently, it is determined which right side tire monitor is the right-front tire monitor and which is the right-rear tire monitor. Also, it is determined which left side tire monitor is the left-front tire monitor and which left side tire monitor is the left-rear tire monitor.

In the embodiment described here, left/right position data contained in each respective tire monitor transmission is used to determine the left/right position information. The left/right position data is encoded based on the acceleration detected by the dual axis accelerometer at each tire monitor.

Also, in this embodiment, the amount of signal received for respective tire monitor transmissions is used to distinguish the right-front tire monitor from the right-rear tire monitor and to distinguish the left-front tire monitor from the left-rear tire monitor. In one embodiment, amount of signal received is defined by the received signal strength, but other measurements may be used, as described herein. Thus, once it is determined which side (right or left) of the vehicle the transmitting tire monitor is on, then determine the front and rear positioning for the tire monitor, statistically the chances of correctly identifying the positions of the tire monitors on the vehicle are greatly improved over the case of first determining front versus rear positioning, then determining right/left positioning.

The voltage regulator 1310 receives power, ground and ignition signals from the electrical system of the vehicle and produces an operating voltage for the controller 1308 at an input 1316 of the controller 1308. The voltage provided at the input 1316 is used to power the circuits of the microcontroller 1308 as well as other components of the control unit 1300, such as the RF receiver 1304, the peak detector 1306 and the communications interface 1312.

The communication interface 1312 provides interface to a bus 1318 for communication of information to other components of the vehicle. In one embodiment, the communication interface 1312 includes a Controller Area Network (CAN) bus controller for transmitting and receiving data on the bus 1218. Other types of communications interface circuits may be substituted.

Figure 14:
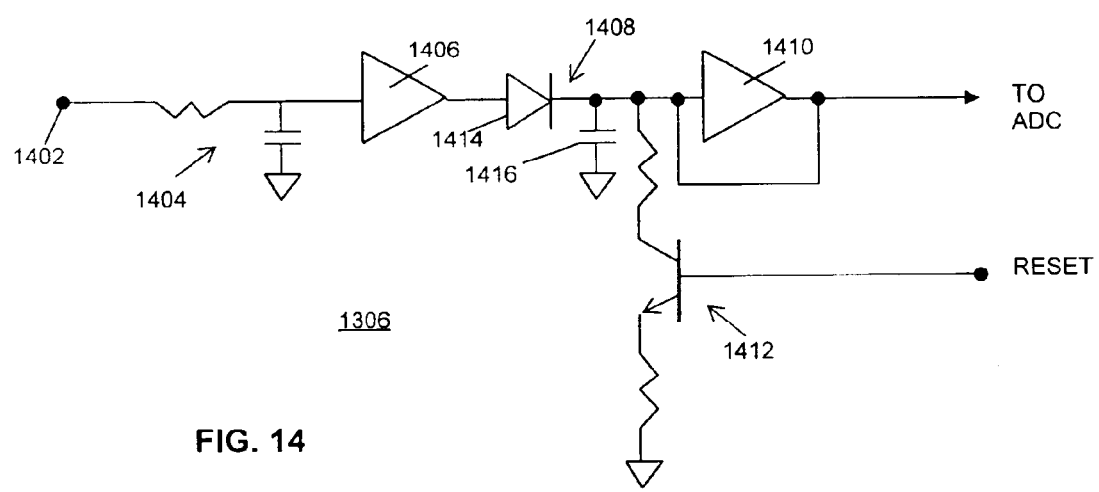
FIG. 14 is a schematic diagram of an embodiment of a peak detector for use in the control unit of FIG. 13.

FIG. 14 is a circuit diagram illustrating the peak detector 1306 of FIG. 13 in conjunction with the controller 1308. The peak detector 1306 includes an RSSI signal input 1402, a low pass filter 1404, an amplifier 1406, a peak detector 1408, a buffer 1410 and a reset circuit 1412.

The RSSI input 1402 receives the RSSI signal produced by the RF receiver 1304 (FIG. 13) of the control unit 1300. The RSSI signal conveys information about the relative received signal strength detected by the RF receiver 1304. In one embodiment, the magnitude of voltage of the RSSI signal is greater depending on the strength of the received signal.

The low pass filter 1404 includes a resistor and a capacitor in the illustrated embodiment. The filter 1404 operates to block or filter relatively high frequencies which may interfere with operation of the peak detector circuit 1306. The RSSI signal received at the RSSI input is preferably a DC signal which varies over time depending on received signal strength.

The amplifier 1406 operates to amplify the filtered RSSI signal. The peak detector 1408 includes a rectifying diode 1414 and capacitor 1416. The diode 1414 and capacitor 1416 operate as a simple peak hold circuit. Between assertions of a reset signal, the peak value of the amplified signal is stored on the common node 1418 between the diode 1414 and capacitor 1416, at the input to the buffer 1410.

The buffer 1410 is configured as a unity gain amplifier in the illustrated embodiment. The buffer 1410 operates to isolate the node 1418 at which the peak signal value stored from other circuitry. The peak value is provided from the peak detector circuit 1406 to the ADC 1320 for further processing.

The reset circuit 1412 includes a transistor and biasing resistors to reset the storage node of the peak detector in response to a reset signal received from the controller 1408. Upon receipt of the reset signal, the transistor is turned on, grounding the storage node and resetting the peak detector circuit 1406.

As will be appreciated by those ordinarily skilled in the art, other types of peak detector circuits may be substituted for the peak detector circuit 1406 of FIG. 14 for use in conjunction with the control unit 1300 of FIG. 13.

FIG. 15 is a flow diagram illustrating one embodiment of a method for operating the tire monitor 700 of FIG. 7. In the embodiment of FIG. 15, the method is associated with an embodiment of the tire monitor 700 which includes a motion detector switch 712 (FIG. 7). The method begins at block 1500.

At block 1502, the tire monitor waits for activation by the motion switch or motion detector. As described above, the motion detector provides an indication to a controller of the tire monitor when the tire including the tire monitor is rolling. The indication may be provided when the speed of the tire reaches a predetermined threshold, such as 15 miles per hour. At block 1502, the controller remains in a loop or stable state awaiting activation by the motion switch.

Once the motion switch activation has been received, the controller of the tire monitor powers up or activates the accelerometer, block 1504. In the preferred embodiment, the accelerometer may be powered on and off under the control of the controller in order to conserve power in the battery which the powers the tire monitor. At block 1506, the acceleration signals from the accelerometer are sampled by the controller. As described above, the accelerometer provides, in one embodiment, an analog signal including two voltages related to the acceleration detected along two orthogonal axis. This signal is sampled over a time period to determine the acceleration. For example, the lead and lag status of the voltage signals from the dual axis accelerometer is determined in order to determine if the wheel is rotating clockwise or counterclockwise, block 1508.

At block 1510, the accelerometer is powered down under control of the controller of the tire monitor. Powering down the accelerometer removes operational power from the accelerometer and its circuits, thereby reducing current drain and power dissipation in the tire monitor, extending the life of the battery which powers the tire monitor.

At block 1512, having determined the rotational direction of the wheel and thereby, the right or left-hand side of the vehicle on which the tire monitor is located, the tire monitor enters its normal transmission mode. Periodically, the tire monitor transmits data for receipt by the control unit of the tire monitor system. The transmissions preferably include status information including position information, tire data, and identification information. Status information can include indicators that the controller has determined the direction of travel of the vehicle and the right or left side positioning of the tire monitor. The tire data indicate information about the tire, such as tire pressure, temperature, etc. The identifier information includes an identifier which uniquely identifies the tire monitor.

In the embodiment of FIG. 15, including the motion switch in the tire monitor, it can be determined that the vehicle is actually driving and not simply backing up by simply looking at the accelerometer output after the roll switch has contacted. The vehicle can not get enough speed to trigger the roll switch when moving in reverse, so the accelerometer is never powered on, block 1504 or sampled, block 1506, in this instance.

FIG. 16 is a flow diagram illustrating an alternative embodiment of a method for operating a remote tire monitor.

This embodiment may be used in conjunction with an embodiment of the tire monitor in which the motion detector is omitted and the accelerometer is used to provide the function of a motion switch, giving the accelerometer dual functionality, motion detection and rotational direction detection. The method begins at block 1600. At block 1602, the accelerometer determines if a predetermined time duration such as 10 seconds has elapsed since the last sample was received from the accelerometer. If not, operation remains in a loop including block 1602. Once the predetermined time has elapsed, at block 1504 the accelerometer is powered up by providing operating power to the accelerometer so that it may begin operation. At block 1606, the output signal from the accelerometer is sampled in order to determined the detected acceleration.

At block 1608, it is determined if the centrifugal force detected by the accelerometer exceeds a predetermined threshold, such as 10 G or 10 times the acceleration due to earth's gravity. This is determined, for example, in just the z plane of the accelerometer. If the centrifugal force does not exceed this threshold, control returns to block 1610 and the accelerometer is powered down to await elapse of the predetermined time, such as another 10 seconds.

If it is determined that the centrifugal force exceeded the predetermined threshold, at block 1612 it is determined if this is the first time this has occurred. If not, at block 1614 the accelerometer is powered down and the time monitor enters a normal transmission mode. This corresponds to the case of ongoing operation, where the vehicle is underway and position information has been stored for each wheel in the vehicle. Control then returns to block 1602 to await elapse of the predetermined time period.

If, on the other hand, this is the first time the detected acceleration level has exceeded the predetermined threshold or 10 G, at block 1618, the acceleration signal from the accelerometer is sampled. This corresponds to the case of a new journey in the vehicle which has begun operation after being parked for a time. Because of the possibility that the tires were rotated or changed since the last journey, the position information must be re-communicated and updated if necessary at the control unit. At block 1620, based on the sampled acceleration signal, the controller determines the rotational direction of the wheel. The controller determines if the wheel is rotating clockwise or counterclockwise. In accordance with the exemplary embodiment given above, the clockwise or counterclockwise rotation of the wheel is determined based on the lead or lag condition of the acceleration signals produced by the accelerometer.

To determine that the vehicle is driving and not simply backing up, the accelerometer is used to estimate the speed of the vehicle. This can be done by measuring the rate of change of the accelerometer output over a predetermined range, such as, for example, +1 G to −1 G. Alternatively, this can be done by measuring the absolute G force in the z direction, for example. Below a certain G force value, such as 10 G, which is equivalent to, for example, 20 miles per hour, no evaluation of accelerometer output is performed. Once the centrifugal force exceeds that threshold, indicating that vehicle speed exceeds the speed threshold of 20 miles per hour, the direction evaluation is performed. This second method is illustrated in FIG. 16.

Figure 17:
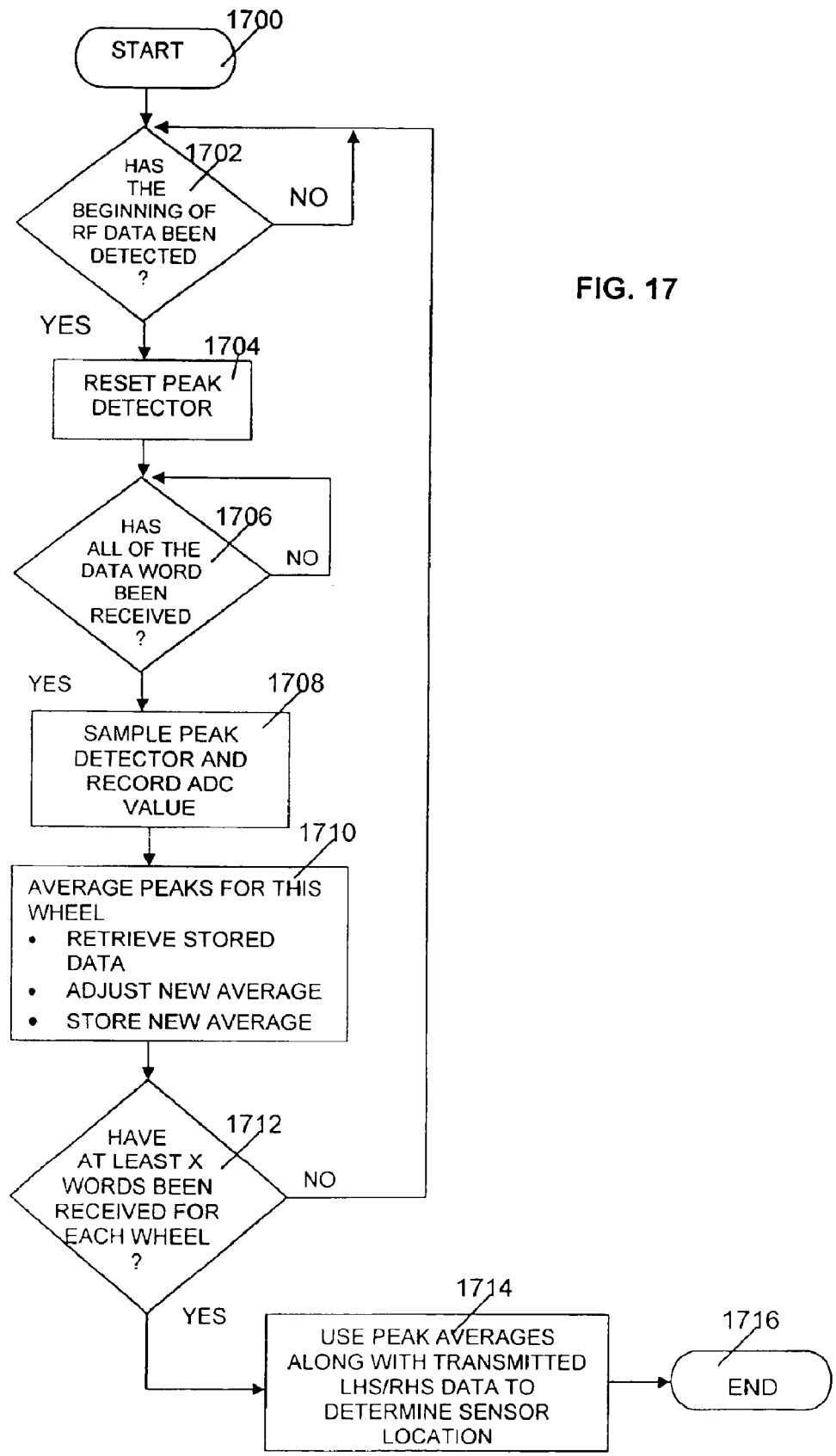
FIG. 17 is a flow diagram illustrating operation of the control unit of FIG. 12.

FIG. 17 is a flow diagram illustrating operation of a control unit such as the control unit 1300 (FIG. 13) of a remote tire monitoring system as described herein. The method begins at block 1700.

At block 1702, it is determined if the receiver has detected the beginning of received radio frequency (RF data). This may be determined, for example, by examining the stream of received data and identifying an initial transmission character, such as a leading string of zero bit data or other data pattern. The tire monitors transmitting the received data must be configured to transmit the specified pattern for identification by the receiver. If the beginning of the transmission, which may be referred to as a frame marker, has not been received, control remains in a loop including block 1702.

Once the beginning of the frame has been detected, at block 1704, the peak detector of the control unit is reset. This is done, for example, by asserting a reset signal to the peak detector. At block 1706, it is determined if all of a transmitted data word has been received. If not, control remains in a loop including block 1706 until the entire transmission has been received. This may be determined by counting the number of bits, where each transmission has a predetermined number of bits or samples. Alternatively, this may be determined by looking for receipt of another frame marker, indicating transmission of a subsequent frame. Other methods for identifying a complete frame transmission may be used as well.

Once a complete data word or frame has been received, at block 1708, the controller samples the peak detector and records or stores a digital value produced by an analog-to-digital converter (ADC) operating in response to the sampled peak detector value. The stored value will subsequently be used to determine the running average value for the peak information.

At block 1710, the running average value for the peak information for this wheel is updated. The stored average peak is retrieved, for example, using the tire monitor identifier as a storage index to retrieve the correct stored data. Subsequently, the new average is adjusted using the newly received peak value. The new average is then stored, again using the received identifier value.

At block 1712, it is determined if at least a predetermined number of words has been received for each wheel. The predetermined number may be any suitable number. A larger number of received data words provides increased reliability and certainty that the data has been correctly received. A reduced number of received words decreases the amount of time required to reliably receive information for each wheel. If the threshold has not been exceeded, control returns to block 1702 to await receipt of a new transmission from a tire monitor. If the threshold has been exceeded, at block 1714, the peak averages determined during the method of FIG. 17 are used to determine which tire monitors are positioned on the forward or front wheels and which are positioned on the rear wheels of the vehicle. Additional detail regarding one embodiment of block 1714 is provided below in conjunction with FIG. 18. The result of the determination of block 1714 is used in conjunction with the transmitted left-hand side or right-hand side data to determine the location of each respective sensor or tire monitor on the vehicle.

Figure 18:
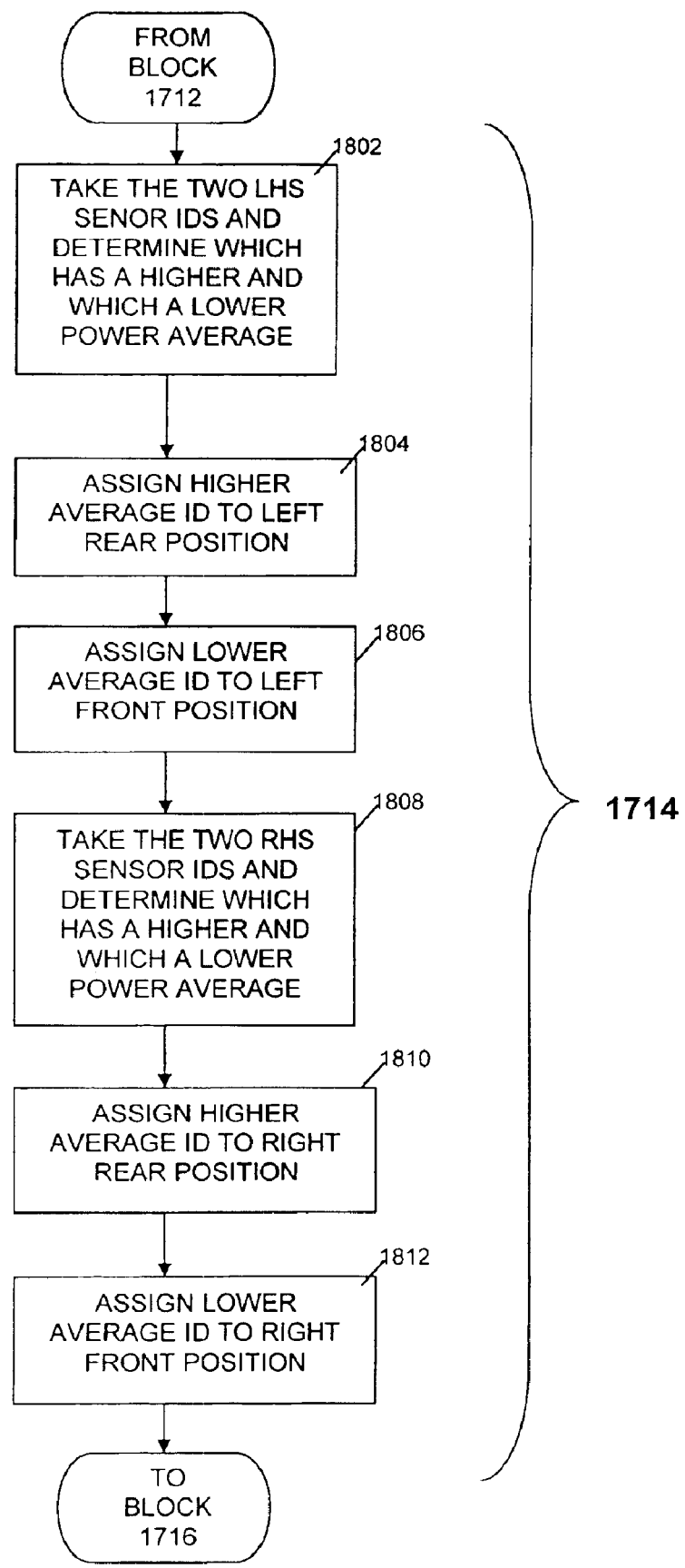
FIG. 18 is a detailed view of one embodiment of the method illustrated in FIG. 17.

FIG. 18 is a detailed view of one embodiment of a portion of the method illustrated in FIG. 17. The illustrated embodiment assumes that the receiver or control unit is positioned in or near the trunk of the vehicle, closest the rear tires and away from the front tires. After processing block 1712 in FIG. 17 and determining that the threshold number of words has been received, at block 1802 the method begins by retrieving the stored data for the two left hand side (LHS) tire monitors. Preferably, the received signal strength information (RSSI) for each tire monitor has been saved or averaged and a running average data has been stored for retrieval. The position information determined by the tire monitors themselves is also stored and used to retrieve only, for example, the left side tire monitor data. At block 1802, using a suitable identifier such as the tire monitor identifier, the data for the left hand side tire monitors is retrieved. The running average data for each left hand side tire monitor is compared.

At block 1804, left hand side tire monitor having the higher running average RSSI data is assigned to the left rear position on the vehicle. Similarly, at block 1806, the lower of the two running average RSSI data is assigned to the left front position. Again, this assumes the receiver is in the trunk or the rear of the vehicle so that radio transmission from rear wheels have a higher average RSSI than the front wheel transmissions. If, instead, the receiver is positioned closer to the front wheels, such as in the dash, the assignments will be the opposite of those indicated in FIG. 18. That is, the tire monitor having the higher average RSSI will be assigned to the left front position and the tire monitor having the lower average RSSI will be assigned to the left rear position.

After the position assignments are made, complete position data is stored for the left hand side tire monitors. The complete position data includes the right/left position data determined by the tire monitors themselves and the front/rear position data determined by monitoring signal strength of the transmitting tire monitors.

The process is repeated for the right hand side tire monitors, starting at block 1808. At block 1808, the data stored for the two right hand side (RHS) tire monitors is retrieved and compared to determine which has the higher average signal strength or RSSI. At block 1810, the tire monitor determined to have the higher average signal strength is assigned to the right rear position. At block 1812, the tire monitor determined to have the lower average signal strength is assigned to the right front position. After the position assignments are made, complete position data is stored for the right hand side tire monitors. The complete position data includes the right/left position data received from the tire monitors and the front/rear position data determined by monitoring signal strength of the transmitting tire monitors. After execution of block 1812, control proceeds to block 1716, FIG. 17

In the embodiment of FIG. 17, front/rear positioning is determining using a running average of received signal strength stored for respective tire monitors of the vehicle. In alternative embodiments, other information and techniques could be used as well or in the alternative. For example, a single received transmission could be used for determining position data, rather than the running average data described above. Alternatively, rather than RSSI data, other information either determined directly or derived from received transmissions, can be used to determine proximity of a respective tire monitor to the receiver.

In alternative embodiments, it may be possible to us received signal strength to distinguish right from left using a single receiving antenna, comparing received signal intensities in conjunction with transmitter identifiers to determine actual wheel position. This alternative technique may be difficult to achieve reliably, however. First, this technique requires a very unique positioning of the receiver within the vehicle, usually at one corner. Even then, it is not guaranteed to be reliable. Second, in the production of tire monitors, there is a spread or manufacturing tolerance in the transmitted power from device to device, typically 6 dB. This variation can make detection of right versus left very difficult. Third, other objects in or around the vehicle can drastically alter the RF environment, decreasing the reliability of the right/left determination when a single receiving antenna is used.

FIG. 19 is a flow diagram illustrating operation in an alternative embodiment of a remote tire monitor system. FIG. 19 illustrates parallel operation at both a tire monitor and the controller or electronic control unit of the remote tire monitor system. The method begins at blocks 1902, 1904.

The embodiment of FIG. 19 shows another way of determining front versus rear location is to use the accelerometer in conjunction with the pressure sensor inside the transmitter. The concept may be described as follows.

As the vehicle accelerates or decelerates, the front and rear wheel pressures will vary by small but different amounts. By analysing the pressure in the pressure sensor with higher resolution it is possible to detect small changes in pressure that occur when the vehicle is braking or accelerating. The pressure sensor of the tire monitor may have a selectable resolution or the controller of the tire monitor may only operate on a selectable number of bits of pressure data.

In this embodiment, the the wheel sensor samples the tyre pressure when it detects a sufficient level of accleration or deceleration. The acceleration or deceleration may be detected by measurement aceleration along the the z plane of the accelerometer. Then the tire monitor transmits a special acceleration message. The special message may be indicated in any suitable manner. One convenient way of indicating this information is use of a separate function code. This message includes the normal ID but also includes an extra few bits to indicate how much the pressure has changed since the last transmission (the norm) and an acceleration or deceleration function code. This pressure fluctuation or delta could be positive or negative.

This data is then processed by the receiver or electronic control unit (ECU). As an example, if the ECU can associate a positive fluctuation in pressure in a left hand side (LHS) wheel and a negative or lesser fluctuation in pressure in the remaining LHS wheel when the vehicle is braking (indicated by the deceleration function code), and similarly for the right hand side (RHS) then the ECU can determine the front/rear location of the sensors. During braking, the front wheel pressure momentarily increases and the rear wheel pressure decreases. As in the other embodiments described herein, the ECU will base its decision of front/rear by analyzing the data of the LHS sensors and the RHS sensors separately.

This technique may be modified for use with other types of vehicles. For example, when a rear wheel drive car is accelerating, the pressure in the rear wheels will increase while the front wheels will see a decrease in pressure. The transmitted codes can be changed to accommodate for variations as can be the processing given to the received data.

In FIG. 19, the tire monitor waits in a loop including block 1906 until the tire monitor determines that the vehicle is accelerating or braking by a sufficient amount to reliably distinguish front from rear wheels. Other conditions such as tire pressure variation due to temperature may be normalized or otherwise accounted for in this process. If an adequate acceleration has not been detected, processing remains in a loop including block 1906.

At block 1808, the tire monitor determines if it experiences a sufficient level of acceleration to distinguish front from rear wheels. This act may be performed by comparing the z axis acceleration signal from the dual axis accelerometer with a predetermined threshold. The threshold may be based on empirical data and may be normalized to improve reliability by reducing false transmissions. This process ensures that low-level acceleration variations are not used as a basis for the rear/front decision, increasing the reliability of the system. If an adequate pressure difference has not been detected, processing remains in a loop including block 1908.

At block 1810, an acceleration message 1922 is transmitted by the tire monitor. In the illustrated embodiment, a particular function code 1924 is included in the acceleration message to indicate the nature of the message and to trigger special processing at the control unit. Also, the acceleration message in this embodiment includes an additional data field 1926 indicating the pressure variation since a baseline transmission. The baseline transmission may be the previous transmission or may be an initial transmission made at the start of a journey or after a predetermined time has elapsed since the start of a journey, or according to any other condition. Also, the acceleration message in this embodiment includes an additional data field 1928 indicating whether the tire monitor determined that it is accelerating or decelerating when the pressure variation data was obtained. Processing at the tire monitor ends at block 1912.

At the control unit, processing is suspended at block 1914, awaiting receipt of the transmission from the tire monitor or from another tire monitor of the vehicle. When a transmission is received, block 1916, the transmitted data is analyzed to determine how the transmission should be handled.

In response to the function code contained in the transmitted message, the controller processes the message to determine if the transmitting wheel is a front or a rear wheel. This is done, in one embodiment, by considering the right or left hand side data included in the message by the tire monitor based on the dual axis acceleration signal from the accelerometer. Using the RHS or LHS data and the transmitted pressure data and acceleration or deceleration code, the controller can determine right versus front positioning of the transmitting wheel.

From the foregoing, it can be seen that the present embodiments provide a method and apparatus which automatically conveys wheel position and data to a receiver in a vehicle. The tire monitors of the system employ dual plane, multiple axis accelerometers to determine their location on the vehicle using quadrature detection. This information is communicated to the system control unit. The system control unit uses the signal strength of the transmission to determine the remainder of the position information, allowing position information to be updated completely automatically. Even after changes in tire position due to tire rotation or replacement of a tire, the system automatically re-learns the position of the tires on the vehicle. Wheel rotation can be monitored by the dual-plane accelerometers at any vehicle speed, without limitations imposed by centrifugal force sensing by the accelerometers. This means that a sensing velocity threshold can be set high enough to eliminate false determinations when the vehicle is backing. Moreover, Only the right/left position information obtained from the respective tire monitors and an indication of tire monitor signal strength are required to reliably identify tire positions on the vehicle. No additional information, such as data over a communication bus or synchronization data are required.

Thus, the tire monitors in accordance with the embodiments disclosed herein are capable of determining at least a portion of their own position on a vehicle. Previous tire monitor systems were limited to transmitting information such as tire pressure information and a tire monitor identifier. No actual position information was transmitted. The receiver had to respond to this transmitted information from two or more tires to determine the position of the tire monitors on the vehicle.

It is a substantial improvement to the efficiency and accuracy of system operation that, for the first time, the tire monitors of the present embodiments can determine their own position on a vehicle. The tires sense the direction of rotation of the wheel with which each tire monitor is associated. The rotation direction is used to determine right or left position information for the vehicle. In one embodiment, the disclosed tire monitors and method detect if the vehicle has begun its journey or is merely backing up, preventing erroneous determination of rotation direction and position information. In another embodiment, even this operation is not required. Tire rotation direction may be determined directly from an accelerometer, and most reliably from an indication of centrifugal acceleration of the tire.

While a particular embodiment of the present invention has been shown and described, modifications may be made. It is therefore intended in the appended claims to cover all such changes and modifications which fall within the true spirit and scope of the invention.

What is claimed is:

1. A tire monitor method comprising:
    at a tire monitor, determining first acceleration along a first axis and second acceleration along a second axis;
    based on the first acceleration and the second acceleration, determining rotational direction of a wheel associated with the tire monitor; and
    determining the position information about position of the tire monitor on a vehicle based on the rotational direction.

2. The tire monitor method of claim 1 further comprising:
    producing a first acceleration signal based on the first acceleration and a second acceleration signal based on the second acceleration;
    determining a lag/lead relationship of the first acceleration signal and the second acceleration signal; and
    determining the rotational direction based on the lag/lead relationship.

3. A tire monitor method comprising:
    at a tire monitor, determining first acceleration along a first axis and second acceleration alone a second axis;
    based on the first acceleration and the second acceleration, determining position information about position of the tire monitor on a vehicle,
    transmitting radio signals to communicate data representative of the position information;
    determining a received amount of the radio signals; and
    based on the received amount, determining additional position information about the position of the tire monitor on the vehicle.

4. The tire monitor method of claim 3 wherein the position information comprises right/left position information and the additional position information comprises front/rear position information.

5. A remote tire monitoring system for a vehicle, the remote tire monitoring system comprising:
    a plurality of tire monitors associated with respective tires of the vehicle, each tire monitor including
        an accelerometer,
        a monitor position information determining circuit responsive to an acceleration signal from the accelerometer, and a position information radio transmitting circuit; and
a control circuit including
a position information radio receiving circuit, and
a respective tire monitor position determining circuit,
wherein the accelerometer is configured to provide accelerometer signals indicative of acceleration in two or more axes substantially in a rotational plane of the respective tire with which the each tire monitor is associated,
wherein the monitor position information determining circuit is configured to receive the accelerometer signal and determine right/left position information for the each tire monitor,
wherein the control circuit is configured to determine an amount of signal received from each respective position information radio transmitting circuit.

6. The remote tire monitoring system of claim 5 wherein the respective tire monitor position determining circuit is configured to determine front/rear position information based on the amount of signal received for each respective position information radio transmitting circuit.

7. A tire monitor method for a tire monitor positioned at a wheel of a vehicle, the tire monitor method comprising:
receiving a tire motion indication;
sampling an accelerometer signal produced by a multiple-axis accelerometer;
determining rotation direction for the wheel based on the accelerometer signal;
determining position information for the wheel based on the rotation direction; and
transmitting data to a remote receiver based on the position information,
powering up the accelerometer prior to sampling the accelerometer signal; and
powering down the accelerometer after determining the rotation direction of the wheel.

8. A tire monitor method for a tire monitor positioned at a wheel of a vehicle, the tire monitor method comprising:
sampling an accelerometer signal produced by a multiple-axis accelerometer;
if an acceleration indication of the accelerometer signal exceeds a threshold,
determining rotation direction for the wheel based on the accelerometer signal;
determining position information for the wheel based on the rotation direction; and
transmitting data to a remote receiver based on the position information.

9. The tire monitor method of claim 8 further comprising:
waiting for a predetermined triggering event;
powering up the accelerometer to sample the accelerometer signal;
if vehicle speed as indicated by the accelerometer signal does not exceed a threshold, powering down the accelerometer; and
waiting for a subsequent triggering event.

10. The tire monitor method of claim 9 further comprising:
comparing the acceleration indication with a turn on threshold to determine the vehicle speed.

11. The tire monitor method of claim 9 further comprising:
comparing the acceleration indication with a turn on threshold to determine if the vehicle is travelling forward or in reverse.

12. The tire monitor method of claim 9 further comprising:
if the vehicle speed exceeds the threshold, determining if the vehicle speed has previously exceeded the threshold;
if the vehicle speed has previously exceeded the threshold, powering down the accelerometer; and
waiting for a subsequent triggering event.

13. A tire monitor method comprising:
at a tire monitor associated with a tire of a vehicle, determining right/left position data based on acceleration detected at a dual axis accelerometer;
at the tire monitor, determining a vehicle acceleration condition from the dual axis accelerometer;
at the tire monitor, determining tire pressure data associated with the acceleration condition;
transmitting from the tire monitor tire pressure information, acceleration information related to the acceleration condition and right/left position information for determination of position of the tire monitor on the vehicle,
detecting acceleration of the vehicle based on an acceleration signal from the dual axis accelerometer;
comparing the detected acceleration with an acceleration threshold; and
transmitting the acceleration information only when the detected acceleration exceeds the acceleration threshold.

14. A tire monitor method comprising:
at a tire monitor associated with a tire of a vehicle, determining right/left position data based on acceleration detected at a dual axis accelerometer;
at the tire monitor, determining a vehicle acceleration condition from the dual axis accelerometer;
at the tire monitor, determining tire pressure data associated with the acceleration condition; and
transmitting from the tire monitor tire pressure information, acceleration information related to the acceleration condition and right/left position information for determination of position of the tire monitor on the vehicle,
wherein determining tire pressure data comprises:
determining a variation in tire pressure from a tire pressure baseline value.

15. The tire monitor method of claim 14 wherein transmitting tire pressure information comprises:
transmitting information about the variation in tire pressure.

16. A tire monitor method for a tire monitor system of a vehicle, the tire monitor method comprising:
receiving tire monitor transmissions from tire monitors positioned at all wheels of the vehicle,
determining left/right position information for each of the tire monitors to identify right side tire monitors and left side tire monitors; and
subsequently, determining which right side tire monitor is a right-front tire monitor and which right side tire monitor is a right-rear tire monitor, and determining which left side tire monitor is a left-front tire monitor and which left side tire monitor is a left-rear tire monitor,
determining amount of signal received for respective tire monitor transmissions; and distinguishing the right-rear tire monitor from the right-front tire monitor and the left-rear tire monitor from the left-front tire monitor based on the amount of signal received.

17. The tire monitor method of claim 16 wherein determining left/right position information for each of the tire monitors comprises:
   detecting left/right position data contained in each respective tire monitor transmission.

18. A tire monitor for use in conjunction with a remote tire monitoring system of a vehicle, the tire monitor comprising:
   a sensing device configured to determine first acceleration along a first axis and second acceleration along a second axis;
   a control circuit configured to determine rotational direction of a wheel associated with the tire monitor based on the first acceleration and the second acceleration and determine position information about position of the tire monitor on the vehicle based on the rotational direction.

19. The tire monitor of claim 18, wherein the sensing device comprises an accelerometer.

20. The tire monitor of claim 18, wherein the first acceleration and the second acceleration are generated from the wheel associated with of the tire monitor.

21. A tire monitor for use in conjunction with a remote tire monitoring system of a vehicle, the tire monitor comprising:
   a sensing device configured to produce a first acceleration signal and a second acceleration signal;
   a control circuit configured to determine rotational direction of a wheel associated with the tire monitor based on a comparison of a wheel angular position between the first acceleration signal and the second acceleration signal and determine position information about position of the tire monitor on the vehicle based on the rotational direction.

22. The tire monitor of claim 21, wherein the sensing device comprises an accelerometer.

23. The tire monitor of claim 21, wherein the first acceleration signal and the second acceleration signal are generated from the wheel associated with the tire monitor.

24. A remote tire monitoring system for a vehicle, the remote tire monitoring system comprising:
   a plurality of tire monitors associated with respective tires of the vehicle, each tire monitor including
      a sensing device configured to produce an acceleration signal,
      a monitor position information determining circuit responsive to the acceleration signal from the sensing device, and
      a position information radio transmitting circuit; and
   a control circuit including
      a position information radio receiving circuit, and
      a respective tire monitor position determining circuit,
   wherein the monitor position information determining circuit is configured to receive the acceleration signal and determine right/left position information for the each tire monitor,
   wherein the control circuit is configured to determine an amount of signal received from each respective position information radio transmitting circuit.

25. The remote tire monitoring system of claim 24, wherein the sensing device comprises an accelerometer.

26. The remote tire monitoring system of claim 24 wherein the respective tire monitor position determining circuit is configured to determine front/rear position information based on the amount of signal received for each respective position information radio transmitting circuit.

27. A tire monitor method comprising:
   at a tire monitor, sensing first acceleration along a first axis and second acceleration along a second axis; and,
   producing a first acceleration signal based on the first acceleration and a second acceleration signal based on the second acceleration;
   based on a comparison of a wheel angular position between the first acceleration signal and the second acceleration signal, determining rotational direction of a wheel associated with the tire monitor;
   based on the rotational direction, determining position information about position of the tire monitor on a vehicle.

28. The tire monitor method of claim 27 further comprising:
   transmitting radio signals to communicate data representative of the position information;
   determining a received amount of the radio signals; and
   based on the received amount, determining additional position information about the position of the tire monitor on the vehicle.

29. The tire monitor method of claim 28 wherein the position information comprises right/left position information and the additional position information comprises front/rear position information.

* * * * *